United States Patent
Anderson et al.

(10) Patent No.: US 10,649,719 B2
(45) Date of Patent: *May 12, 2020

(54) NON-CONTACT ROTARY FADER

(71) Applicant: Sound Devices, LLC, Reedsburg, WI (US)

(72) Inventors: Matt Anderson, Baraboo, WI (US); Steven Popovich, Little Chute, WI (US); Paul Isaacs, Middleton, WI (US); Jason McDonald, Reedsburg, WI (US)

(73) Assignee: SOUND DEVICES, LLC, Reedsburg, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/231,374

(22) Filed: Dec. 21, 2018

(65) Prior Publication Data
US 2019/0146748 A1 May 16, 2019

Related U.S. Application Data

(63) Continuation of application No. 14/482,779, filed on Sep. 10, 2014, now Pat. No. 10,180,818.

(51) Int. Cl.
*G06F 3/16* (2006.01)
*G10H 1/46* (2006.01)
(Continued)

(52) U.S. Cl.
CPC .............. *G06F 3/165* (2013.01); *G10H 1/46* (2013.01); *H04H 60/04* (2013.01); *G10H 2220/311* (2013.01); *H01H 2003/008* (2013.01)

(58) Field of Classification Search
CPC ..... G06F 3/165; G10H 1/46; G10H 2220/311; H04H 60/04; H01H 2003/008
See application file for complete search history.

(56) References Cited

U.S. PATENT DOCUMENTS 3,891,905 A 6/1975 Muller
3,946,691 A 3/1976 Freeman
(Continued)

FOREIGN PATENT DOCUMENTS

JP 3294094 6/2002

OTHER PUBLICATIONS

Badescu et al., "Rotary Haptic Knob for Vehicular Instrument Controls," Proceedings of the 10th Symp. on Haptic Interfaces for Virtual Envir. & Teleoperator Systs (HAPTICS '02), 2002, 2 pages.
(Continued)

*Primary Examiner* — Fan S Tsang
*Assistant Examiner* — David Siegel
(74) *Attorney, Agent, or Firm* — Foley & Lardner LLP

(57) ABSTRACT

A rotary fader apparatus includes a fader control knob that is directly attached to the rotor of a non-contact electrical motor. The apparatus may produce a fade effect based on the rotational position of the fader control knob and may be automated through signals to the motor. Such a rotary fader apparatus may be used, for example, in audio mixing applications to provide automated or manual rotary control of track fading. The motor may also be used to alter the feel of the movement of the fader control knob and/or provide tactile feedback in response to mixing parameters or signal properties.

18 Claims, 12 Drawing Sheets

(51) Int. Cl.
*H04H 60/04* (2008.01)
*H01H 3/00* (2006.01)

(56) References Cited

U.S. PATENT DOCUMENTS

| | | | |
|---|---|---|---|
| 4,501,186 A * | 2/1985 | Ikuma | G10H 3/182 |
| | | | 84/726 |
| 5,189,355 A | 2/1993 | Larkins et al. | |
| 6,270,239 B1 | 8/2001 | Sund | |
| 6,424,356 B2 | 7/2002 | Chang et al. | |
| 6,438,241 B1 * | 8/2002 | Silfvast | H04H 60/04 |
| | | | 307/112 |
| 6,441,806 B1 * | 8/2002 | Jaeger | G02F 1/13306 |
| | | | 345/172 |
| 6,480,752 B1 * | 11/2002 | Blume | G01D 5/145 |
| | | | 700/56 |
| 6,813,361 B1 | 11/2004 | Jeffs et al. | |
| 6,839,441 B1 | 1/2005 | Powers et al. | |
| 6,873,233 B2 | 3/2005 | Sugiyama et al. | |
| 7,173,506 B2 | 2/2007 | Ross, Jr. | |
| 8,073,169 B2 | 12/2011 | Rosen | |
| 8,174,512 B2 | 5/2012 | Ramstein et al. | |
| 8,314,580 B2 * | 11/2012 | Grogg | H02P 6/182 |
| | | | 318/254.1 |
| 2004/0032395 A1 | 2/2004 | Goldenberg et al. | |
| 2006/0012584 A1 * | 1/2006 | Vassallo | G06F 3/016 |
| | | | 345/184 |
| 2006/0066173 A1 | 3/2006 | Kim et al. | |

OTHER PUBLICATIONS

International Preliminary Report on Patentability issued on PCT/US2015/045682, dated Mar. 14, 2017.

International Search Report and Written Opinion issued on PCT/US2015/045682, dated Nov. 23, 2015.

Search Report issued on EP Application 15839491.6, dated May 23, 2018.

* cited by examiner

NON-CONTACT ROTARY FADER

BACKGROUND

In audio processing and other electrical signal controls, a typical fader is a device, element, or interface that enables user-control of the amplitude of various input signals. For example, a set of audio faders may allow a processing engineer to selectively and smoothly adjust the amplitude for a number of individual input signals before combining (or mixing) them into one or more output signals for recording. Typical faders are constructed using either linear sliders or rotary knobs physically attached to various actuation components through a number of gears, chains, belts, bands and/or potentiometers. In the case of motorized faders, actuation components connected to electronic control circuitry or programming may drive the physical position of fader controls in response to desired signal level conditions. Historically, this has been accomplished through physically connected control mechanisms.

SUMMARY OF THE DISCLOSURE

The present inventors have recognized a need for a motorized rotary fader that is simple in design and capable of offering an enhanced and customizable user-experience. Accordingly, the following disclosure describes systems, methods, devices, and computer media that may help to produce a more efficient, reliable, and user-controllable fader experience through a motorized rotary fader. Additionally, susceptibility to wear along with a coggy or gritty feel that is necessarily a part of physically coupled faders due to gears, pulleys, sensors, electrical connections and/or contact motors may be reduced or eliminated by the rotary fader of the present disclosure. A further advantage of the rotary fader is the substantial removal of mechanical interference that allows for more smooth and precise control of the rotary fader in terms of its position, motion and/or applied torque. Other advantages of the present embodiments will be clear to those of skill in the art.

In one embodiment, an exemplary fader apparatus includes a fader control knob directly attached to a rotor of a non-contact motor. The fader apparatus also includes a sensor system configured to detect a rotational position of the rotor and control circuitry configured to cause a fade effect in response to detecting the rotational position of the rotor.

In another embodiment, an example method for using a fader apparatus involves a sensor system detecting a rotational position of a rotor of a non-contact motor, with the rotor being directly attached to a fader control knob. The method also involves control circuitry causing a fade effect in accordance with the detected rotational position of the rotor. This fade effect is caused in response to detecting the rotational position.

In another example method, a fader apparatus receives a signal representing a desired feel effect for the fader control knob. The method also involves the apparatus receiving, from a sensor system, an indication of a user-interaction with the fader control knob. The method further involves responsively controlling a stator current to provide a predetermined proportion of torque associated with the desired feel effect.

In another example method, a fader apparatus receives a signal representing a desired fade effect. In response to the received signal, the method involves providing a torque sufficient to rotate the fader control knob to a position associated with the desired fade effect.

In another example method, a fader apparatus provides tactile feedback to a user in response to the position of a fader control knob and/or program signals derived from the state of a mixer. These may be in response to signals it receives and/or programmable features for mixing parameters along with the user-dialed settings.

In yet another embodiment, an illustrative fader apparatus includes a fader control knob attached to a rotor of a non-contact motor. The rotor is configured to provide a force sufficient to rotate the fader control knob to a position associated with a desired fade effect. Further, current through a stator of the non-contact motor is controlled to provide a torque of the non-contact motor associated with a desired feel effect when being operated by a user.

The foregoing is a summary of the disclosure and thus by necessity contains simplifications, generalizations and omissions of detail. Consequently, those skilled in the art will appreciate that the summary is illustrative only and is not intended to be in any way limiting. Other aspects, inventive features, and advantages of the devices and/or processes described herein, as defined by the claims, will become apparent in the detailed description set forth herein and taken in conjunction with the accompanying drawings.

DETAILED DESCRIPTION

Disclosed herein are systems, devices and techniques. The devices and systems may include a rotary fader apparatus and the techniques may include processes that use or support the use of such rotary fader apparatuses. In its construction, the rotary fader apparatus may include a fader control knob that may freely rotate, supported solely on a simple low-friction support (e.g., a bearing, bushing, etc.) along a shaft, having preferably virtually no perceptible opposition to motion and a wear expected to exceed decades of use. In alternate embodiments, a small amount of simulated opposition to motion, enough to provide a tactile sensation to a user without interfering with a substantially non-contact control described below, may be imposed on the fader control knob and/or the shaft. Other than such supporting structures, this design may allow elimination of substantially all physical connections (in any form, mechanical or electrical) required for sensing positions, moving/rotating or controlling the feel of the fader control knob.

The disclosure is separated into two main sections. The first section discusses features of example and systems. The subsequent section discusses techniques, methods, and procedures. Although the section regarding example methods makes reference to elements described in the section regarding the example systems, this is not intended to imply that the example systems and methods must be used together. Rather, the example methods may be carried out using any suitable system or combination of systems. Likewise, procedures other than those outlined in the example methods may be carried out using the described example systems.

I. Example System and Device Architecture

Figure 1:
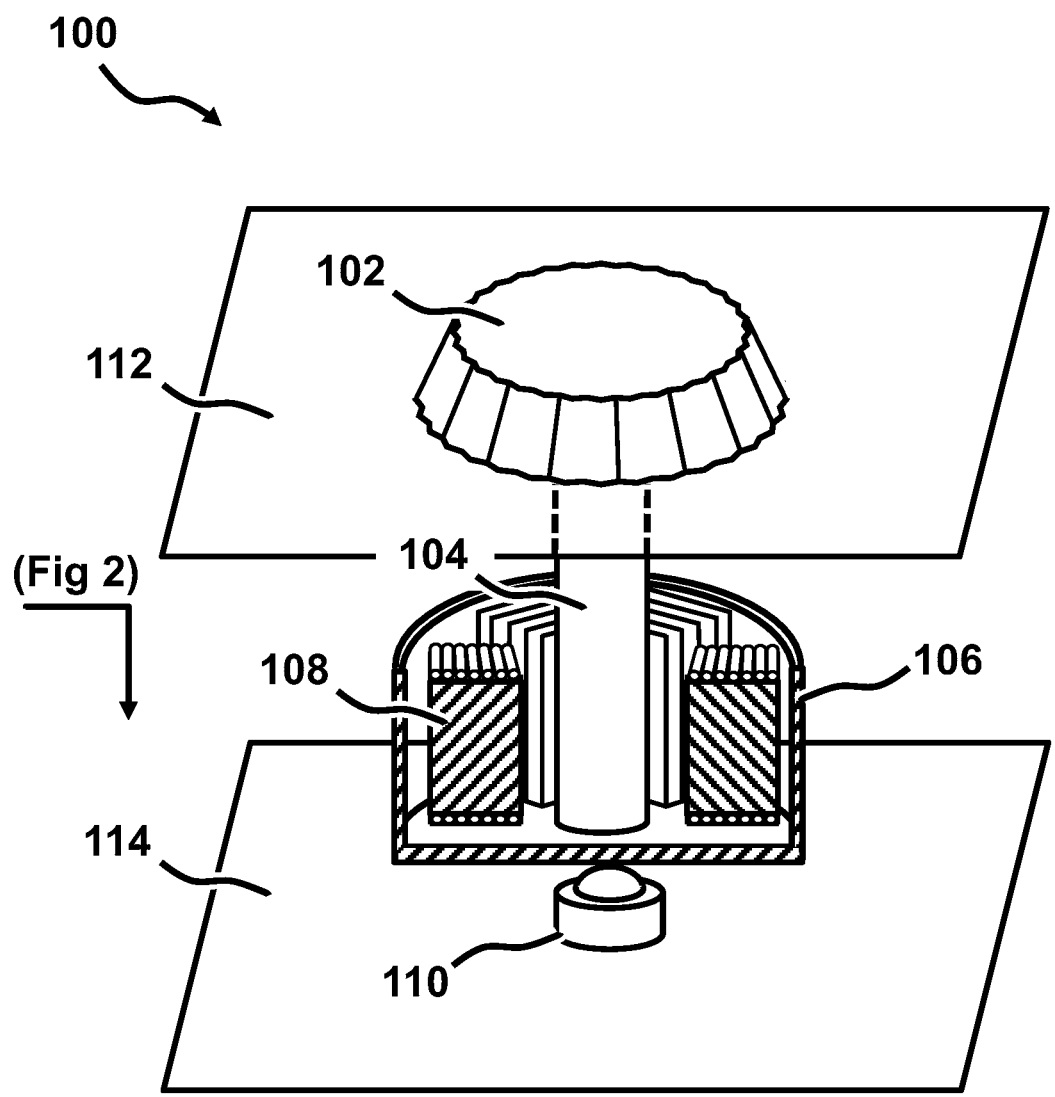
FIG. 1 is a simplified perspective schematic illustrating elements of a rotary fader according to an exemplary embodiment.

FIG. 1 displays one arrangement of elements in a rotary fader 100 according to an example embodiment. As shown, the rotary fader 100 includes a fader control knob 102 directly coupled to a shaft 104 that includes or is fixedly attached to a cup shaped magnetic rotor 106. As shown, the rotor 106 surrounds stator coils 108, which may be configured to receive the signals in accordance with the position and/or force on the rotor 106. Additionally, as shown, a mechanical pushbutton 110 is disposed below the rotor 106. The rotary fader 100 also includes a top plate 112 beneath the fader control knob 102 and concealing the rotor 106, the stator coils 108, and the shaft 104 of the rotary fader. The rotary fader 100 further includes a bottom plate 114, providing mechanical support for the pushbutton 110. Although not shown overtly in FIG. 1, additional elements, including mechanical support structures and electronics may be used in the embodiment shown in FIG. 1.

The fader control knob 102 may be any type of rotary control interface with which a user may interact. In this context, the word "rotary" may be used to describe the fact that the fader control knob 102 is movable in a rotational pattern. Such a rotational pattern may be preferably circular. However, the rotational pattern is not so limited. In alternate embodiments, other rotational or substantially rotational patterns may be used. Additionally, the fader control knob 102 need not be circular, as it is shown in FIG. 1. Rather, knobs of any shape may be used in an example embodiment. Furthermore, in some configurations, the fader control knob 102 may include one or more position indicators to show the relative position of the rotary fader 100. Such indicators may be physical (e.g., a point, divot, scallop, bar) or electronic (e.g., a light on the fader control knob 102, a light on the top plate 112, etc.) in nature. In some electronic implementations, a plurality of possible indicator positions may be disposed around the fader control knob 102, and one or more particular indicator positions may be activated in accordance with how the rotary fader 100 is currently being applied.

The fader control knob 102 may be fixedly coupled to the shaft 104. In some embodiments, the fader control knob 102 and the shaft 104 may be a single molded element. In other cases, the fader control knob 102 may be physically attached such that any force applied to the fader control knob is applied to the shaft 104 with substantially equal magnitude. It is noted that some force or motion may be reduced due to slippage, material deformations, or other practical necessities. Such attachment may be keyed, frictional, adhesive, brazed, or any other known attachment between two elements. Similarly, the rotor 106 and the shaft 104 may be fixedly attached either as a single piece or through any type of fixed connection. By such attachments, any movement or force at the fader control knob 102 may be directly translated to the rotor 106 and any movement or force at the rotor 106 may be directly translated to the fader control knob.

In addition to being rotationally movable, the fader control knob 102 may be movable in other ways. For example, the fader control knob 102 may be at least slightly elevated above the top plate 112 in order to allow clearance for pressing down and/or pulling up of the rotary control knob. In an example embodiment, the pushbutton 110 may be disposed such that a downward force applied to the fader control knob 102 may cause actuation of a surface of the pushbutton and, thereby, cause activation of any element under control of the pushbutton. In other embodiments, the pushbutton 110 may be replaced by a control structure that responds to upward force or motion on any part of the assembly involving the fader control knob 102, the shaft 104 and/or the rotor 106. For example, a lever may be attached below the rotor 106. As another example, a second pushbutton may be attached between the underside of the top plate 112 and a top of the rotor 106, such that upward motion actuates the top pushbutton. Any other arrangement of physical actuators or sensors may be used in an example embodiment to allow additional ways to send control signals from the rotary fader 100. In still other embodiments, both upward and downward movement sensors may be included or additional sensors may be included to detect translational (non-rotational) movements in directions other than vertical. However, some embodiments may include no translational movement sensors, and rotational movement alone may be controlled or measured.

The shaft 104 may be constructed of any material that has sufficient mechanical strength to fixedly attach the fader control knob 102 to the rotor 106. In some preferable embodiments, the shaft 104 may be constructed of a light-weight material to avoid adding inertia to the movement of the assembly of the fader control knob 102, the shaft and the rotor 106. In other embodiments, heavier materials may be used to improve the mass, strength or reliability of the above mentioned assembly. As shown in FIG. 1, the shaft 104 may be cylindrical in shape and sufficiently long to extend through the stator coils 108. Other shapes and sizes of the shaft 104 may be used in place of the characteristics shown. Although the shaft 104 is depicted as relatively long in FIG. 1, the shaft may be preferably only as long as needed to extend through the stator coils 108. Since, in some embodiments, the stator coils 108 may be affixed to the underside of the top plate 112, the shaft 104 may be quite short. Additionally, since the fader control knob 102 and/or the rotor 106 may be integrally connected to, or fabricated as a single piece with the shaft 104, the shaft may be considered a feature of the fader control knob and/or the rotor rather than a separate element, in some embodiments. In such a case, only a single connection (or no connection at all) may be made to couple the fader control knob 102 and the rotor 106.

Figure 2:
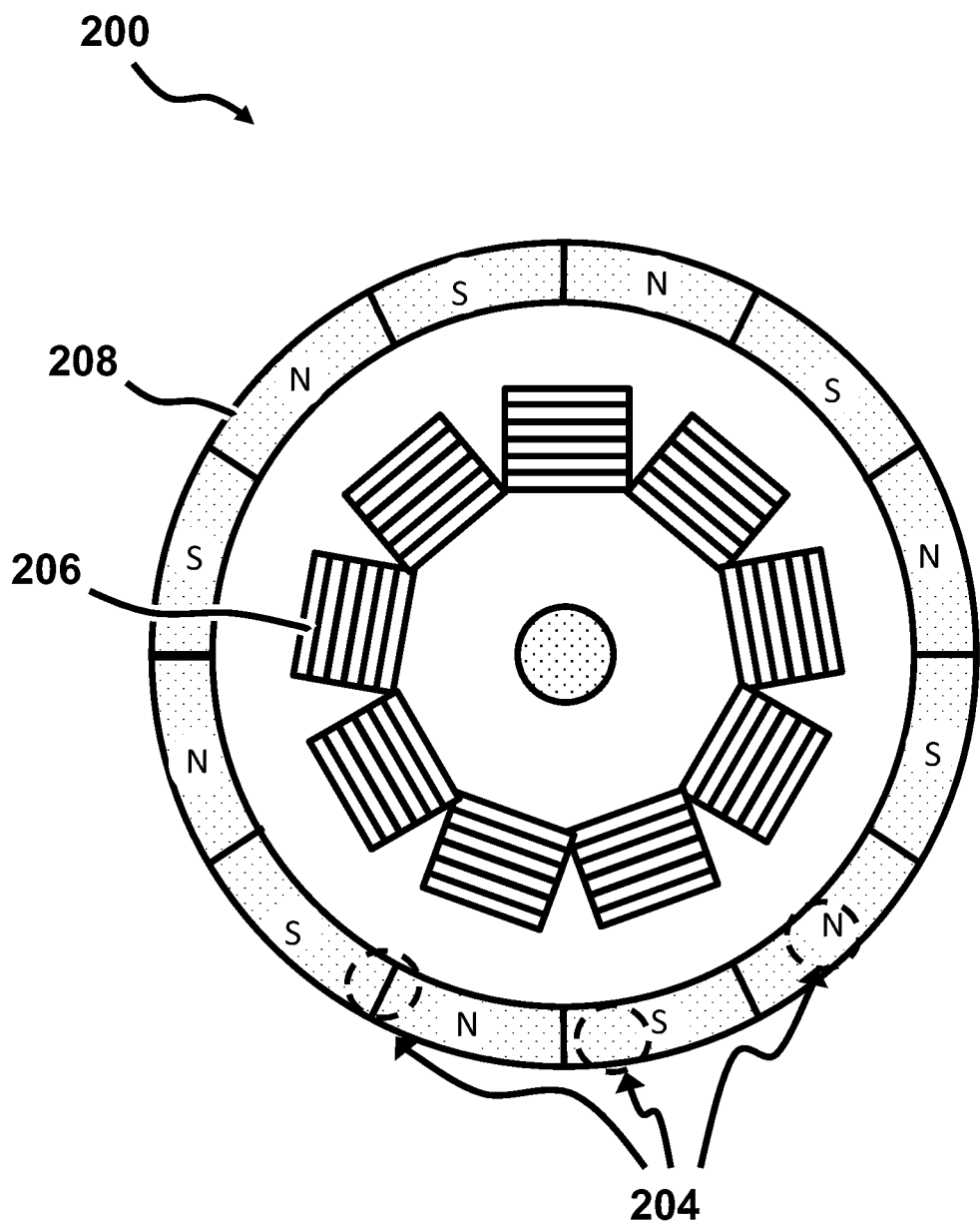
FIG. 2 is a top view schematic illustrating elements of a non-contact motor used by the rotary fader of FIG. 1 according to an exemplary embodiment.

Additionally, the rotor 106 and the stator coils 108 may constitute at least part of an electrical motor (described in FIG. 2 below). In an illustrative embodiment the motor may be a brushless direct current motor (BLDC motor) or a contactless motor in which electrical current is not drawn from physical electrical connections to the rotor 106. In such a motor, the rotor 106 may include magnetic components disposed on the vertical portions of the cup-shaped body of the rotor. Such magnetic portions may be permanent or electrically-induced magnetic materials arranged such that north and south poles alternate around the circumference of the cup portions that encircle the stator coils 108. For example, FIG. 2 shows a top view (a corresponding perspective direction is labeled "FIG. 2" in FIG. 1) of a rotor 208, with twelve magnetic poles ("N" and "S") alternating around a nine-coil stator 206 in a non-contact motor 200. Although the poles are shown in FIG. 2 as having sharp cutoffs between the north and the south polarities, the actual changes may be gradual between each pair of poles, such that a roughly sinusoidal magnetic flux may be established around the circumference of the rotor 208. Electromagnetic laws may show that, in the arrangement shown in FIG. 2, the motion of the rotor 208 may be directly related to the current through the coils of the stator 206.

In particular, the torque (or rotational force) produced in the motor 200 (or a similar BLDC motor) is proportional to the cross-product between a stator flux (that is, flux generated by an applied current through the motor windings of the stator 206) and a rotor flux (that is, flux generated due to the magnetic structure of the rotor 208). When current is applied to the coils of the stator 206, a magnetic field is generated through the stator. By controlling the current applied to the stator 206 to produce a particular stator magnetic field, a torque may be induced in the rotor 208, whereby a force may be applied to align a magnetic field of the rotor with the stator magnetic field. For a fixed level of magnetic field (or current), the maximum torque may be obtained when the magnetic fields for the stator 206 and the rotor 208 are orthogonal or at locations where the sign of the angular displacement produces either a clockwise or counterclockwise rotation from the top perspective of FIG. 2.

Specifically, in a three-phase system with windings of the stator 206 grouped as either a, b, or c the relationship between the (scalar) values for the current through the windings a, b and c ($i_a$, $i_b$, and $i_c$, respectively) of the stator and the complex (vector) stator current ($i_s$) may be defined by the relation:

$$\vec{i_s} = i_a + e^{j\pi 2/3} i_b + e^{j\pi 4/3} i_c = i_r e^{j\varphi r}$$

In addition to describing the currents as phasors having magnitude and angle, it may be also useful to reference the phasor current in relation to the rotating frame of reference referred to by an in-phase axis (called the d-axis, aligned with the rotor flux) and a quadrature axis (called the q-axis). The stator current may be decomposed into components projected onto the d- and q-axes, or a flux component and torque component, respectively, with the axes being aligned with a reference point such as the center of rotation for the rotor 208.

In the embodiment shown in FIG. 2, the rotor 208 may have a roughly sinusoidal or trapezoidal distribution varying along the twelve poles, described above. Therefore, once a current vector is supplied, six angular locations where the (local) flux vector is in alignment with the current vector, or six stable angular positions for the rotor position, may be created. When the rotor 208 is turned physically out of such a stable condition, while the fixed current vector continues to be supplied, a torque may be supplied until the rotor is turned halfway to an adjacent stable condition (40° for the illustrated embodiment), at which point, the torque may be working in the same direction as the rotation. Thus, a smooth sinusoidal cogging torque may be experienced with several stable positions separated by local areas of instability, as explained below.

Figure 11:
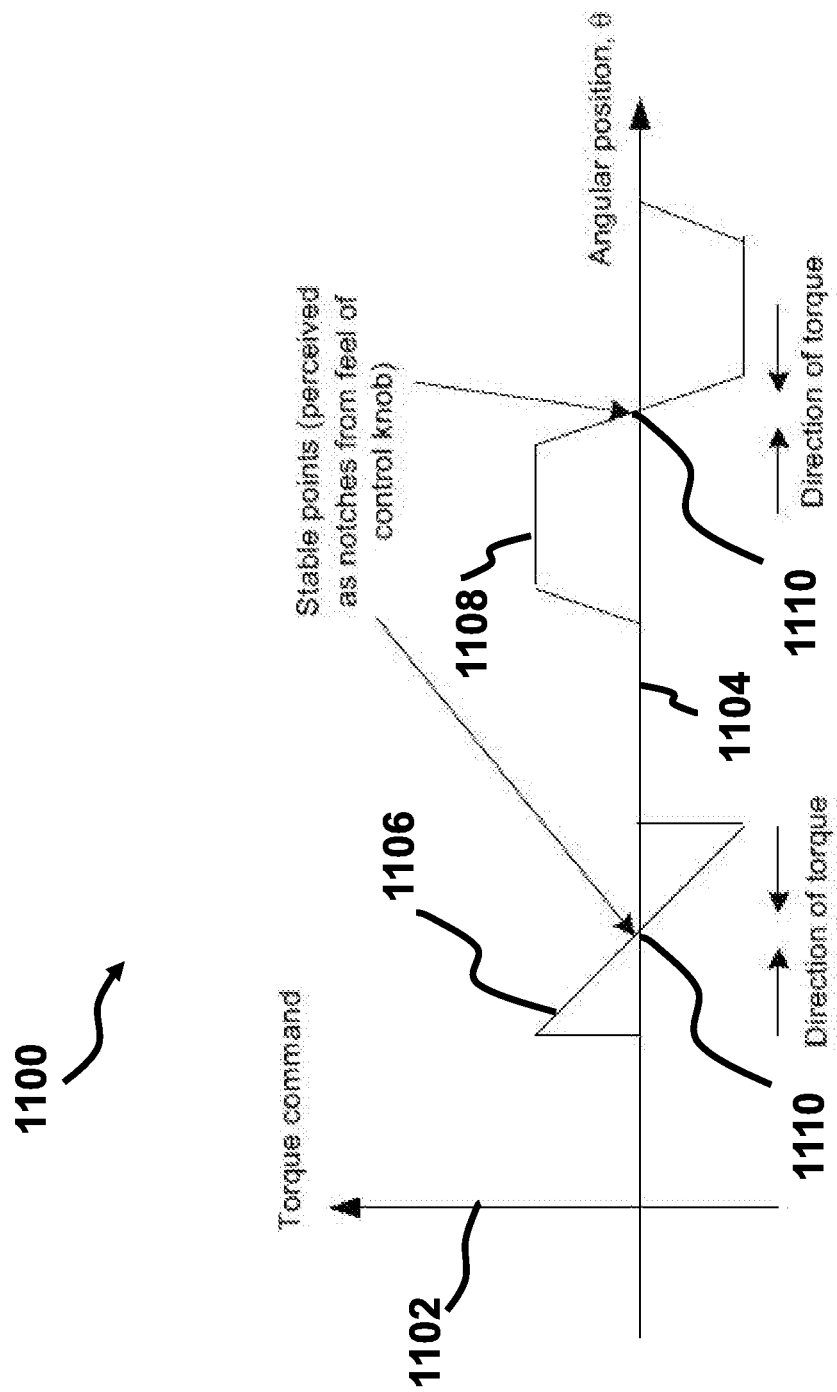
FIG. 11 is a waveform illustrating the creation of perceived notches on a fader control knob of the rotary fader of FIG. 1, according to one exemplary embodiment.

Referring to FIG. 11 in conjunction with FIG. 2, an exemplary graphical illustration 1100 of a torque waveform as a function of a sensed position of the rotor 106, 208 is shown, in accordance with at least some embodiments of the present disclosure. Specifically, the graphical illustration 1100 plots a torque command on Y-axis 1102 against an angular position of the rotor 106, 208 on X-axis 1104. The graphical illustration 1100 further shows two exemplary notches 1106 and 1108, each having a stable position 1110. Specifically, the notches 1106 and 1108 may be created by generating a current vector, as explained above, to create a torque pattern as a function of sensed position of the rotor 106, 208 based upon feedback from the Hall-sensors. Such a torque pattern may create the stable position 1110 in each of the notches 1106 and 1108. Furthermore, the shape of the notches 1106 and 1108 may determine the characteristics of those notches. For example, the notch 1108 may have a wider range compared to the range of the notch 1106. Similarly, the spacing between the notches may be decreased or increased by altering the shape or position of those notches.

Notwithstanding the fact that the graphical illustration 1100 shows only two notches (e.g., the notches 1106 and 1108) having specific shapes, in other embodiments, notches having various other shapes may be implemented. For example, in at least some embodiments, the notches may have a sinusoidal shape of the torque against sensed position curve. Advantageously, by custom defining the notches 1106 and 1108, a family of configurable notches (also referred to herein as configurable detents) may be created where the rotor 106, 208 may "stick" at closely spaced intervals. Further, the notches 1106 and 1108 may be programmable in terms of amplitude, width, density, and shape of the notch. Additionally, the notches 1106 and 1108 may be placed anywhere in a rotation of the fader control knob 102 by defining the torque waveforms as a function of sensed position (e.g., the notches 1106 and 1108) with no dependence on the configuration of the motor 200.

Returning back to FIG. 2, in some embodiments, markings on the top plate 112 of the rotary fader 100 may provide indications of the notches and where the stable positions are located (with respect to some marking or feature on the fader control knob 102). Such markings may include descriptors of the levels. For example, an audio fader in which each notch represents a decibel sound level may include markings that show what decibel level is associated with each notch. As will be described, notches may change position, number, and other characteristics. Therefore, the markings on the top plate 112 may be changeable (moving, dynamic, displayed, virtual, etc.) to show the current settings of the rotary fader 100. Additionally, if the fader control knob 102 is allowed to turn multiple revolutions, the markings may change depending on which revolution the fader control knob is currently operating.

Correspondingly, if the current through the coils of the stator 206 is changed in a way that alters the current vector alignment, a physical rotation may be produced in the motor 200 by shifting the phase of the current vector (of sufficient magnitude to overcome friction, rotor inertial mass, or other opposition to motion) through six full cycles, producing one full physical revolution of the rotor 208. With this technique, the rotary fader 100 may arbitrarily position the rotor 208 by driving or holding the current vector at a phase corresponding to any desired physical position or movement.

Furthermore, in cases where the fader control knob 102 is held or moved by a user or other outside force, an arbitrary torque (within rated limits of the motor 200) may be produced by varying the magnitude and phase of the current vector corresponding to that angular location. Specifically, for some motor constant, $k_T$, that depends on the motor parameters, a programmable torque may be produced with either a positive or a negative value, T described by the equation:

$$T = k_T |\vec{i_s}| \sin(\varphi - \theta),$$

where θ is the physical angular direction of the d-axis, and φ is the physical angular direction of the current.

Although FIG. 1 shows a considerable gap between the stator coils 108 and the top plate 112, in some embodiments, the stator coils 108 may be in close proximity, or attached directly to the top plate. In such an embodiment, circuitry that controls and/or monitors the current in the stator coils 108 may be included on the underside of the top plate 112. Indeed, such processing circuitry, the stator coils 108, and other mechanical constructs may be treated as a single integrated "stator-support unit." Similarly, the rotor 106, 208, the fader control knob 102, and the shaft 104 may also be treated as an integrated, preferably solid-state "rotor-knob unit" that within itself, may only require the presence of magnets for operation. Furthermore, the rotor-knob unit may freely rotate in a substantially non-contact coupling with the stator-support unit. The "non-contact" nature of the rotor-knob unit and the stator-support unit may be further described in terms of exchange of energy between the stator-support unit and the rotor-knob unit. Specifically, by virtue of having a non-contact exchange of energy between the rotor-knob unit and the stator-support unit, no physical electrical connection or mechanical mechanism may be required for transferring energy (e.g., torque in the direction of rotation or stationary torque from which energy may be derived if rotation is allowed) into the rotor-knob unit. Rather, energy may be imported into the rotor-knob unit by way of a magnetic coupling across the gap separating the rotor-knob unit and the stator-support unit. Therefore, in at least some embodiments, even though a mechanical or electrical component (e.g., a support component) may be provided between the rotor-knob unit and stator-support unit, the energy transferred into the rotor-knob unit may be entirely magnetic. Furthermore, it is to be noted that the Hall-sensors described above may also be magnetically coupled to the rotor 106, 208. Therefore, both energy transfer into and information transfer out of the rotor-knob unit may require no physical connection or contact between the rotor-knob unit and the stator-support unit.

In one example embodiment, the motor 200 may be a three-phase brushless motor from Nidec Corp. (part number 20N210F020), although other types of motors and specific motor parts may be used and are anticipated by the present inventors. One advantage of the motor 200 is the inclusion of Hall effect sensors integrated into the circuit board that attaches to the coils of the stator 206. One function of Hall effect sensors is to monitor the rotational position of the rotor 106, 208 with respect to the stator 206 and/or with respect to some initial position. In this capacity, the Hall effect sensors may be used to track movements of the rotor 106, 208 (and, therefore, the movements of the fader control knob 102) to determine how to fade or alter an input sound signal. One set of example relative positions for three Hall-effect sensors are shown as element 204 in FIG. 2. As shown, the sensors may each detect the induced Hall effect from a different magnetic polarity of the rotor 106, 208 that happens to align with the sensor.

In some embodiments, Hall sensors, or other sensors (e.g., light or sound-based proximity sensors, capacitive or magnetic air-gap sensors, actuators, motion sensors, mechanical connectors) may be used for detecting translational movement of the rotor 106, 208 or other elements of the rotary fader 100. Translational movement may be movement in any direction that is not rotational in nature. For example, in embodiments that do not include the pushbutton 110, translational sensors may track the vertical movement of the rotor 106, 208 to activate various functions of the rotary fader 100. In such an embodiment, several different functions may be assigned to various vertical positions of the rotor 106, 208 (which translate to vertical positions of the fader control knob 102). Additionally, movements of the fader control knob 102 or the rotor 106, 208 across the top plate 112 may be measured and used as a source of additional input signals. For example, the top plate 112 may include slots around a through-hole for the shaft 104, so that the fader control knob 102 (along with the shaft 104 and the rotor 106, 208) may be moved along one or a few axes. Each potential position of the fader control knob 102 may be assigned to an input signal or modification signal for the output of the rotary fader 100. As a particular implementation case, the fader control knob 102 may be moveable from left to right, with the rotary fader 100 modifying one audio track when the fader control knob is in the left position, and modifying a second audio track when the fader control knob is in the right position. In order to support such movements, the stator 206 may also be moveable across the back side of the top surface 112.

In an exemplary embodiment, the rotary fader 100 also includes various components and subsystems that function to alter input signals (such as amplifying or attenuating audio signals) in accordance with movements at the rotary fader. Additionally, the rotary fader 100 may also include motor-control circuitry configured to cause movements at the rotary fader based on stored or received input signals.

Figure 3:
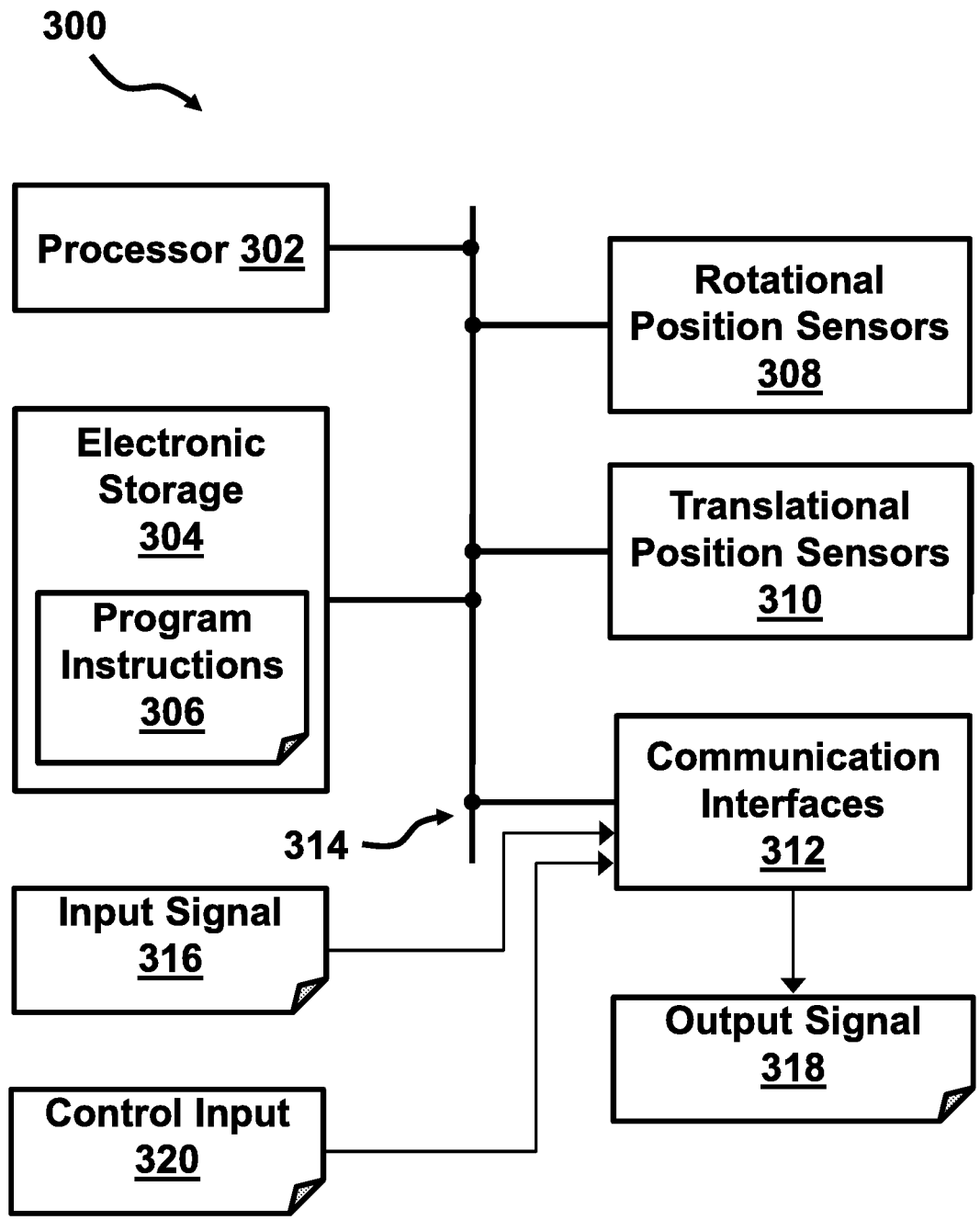
FIG. 3 is a simplified block diagram illustrating additional elements of the rotary fader of FIG. 1 according to an exemplary embodiment.
Figure 4:
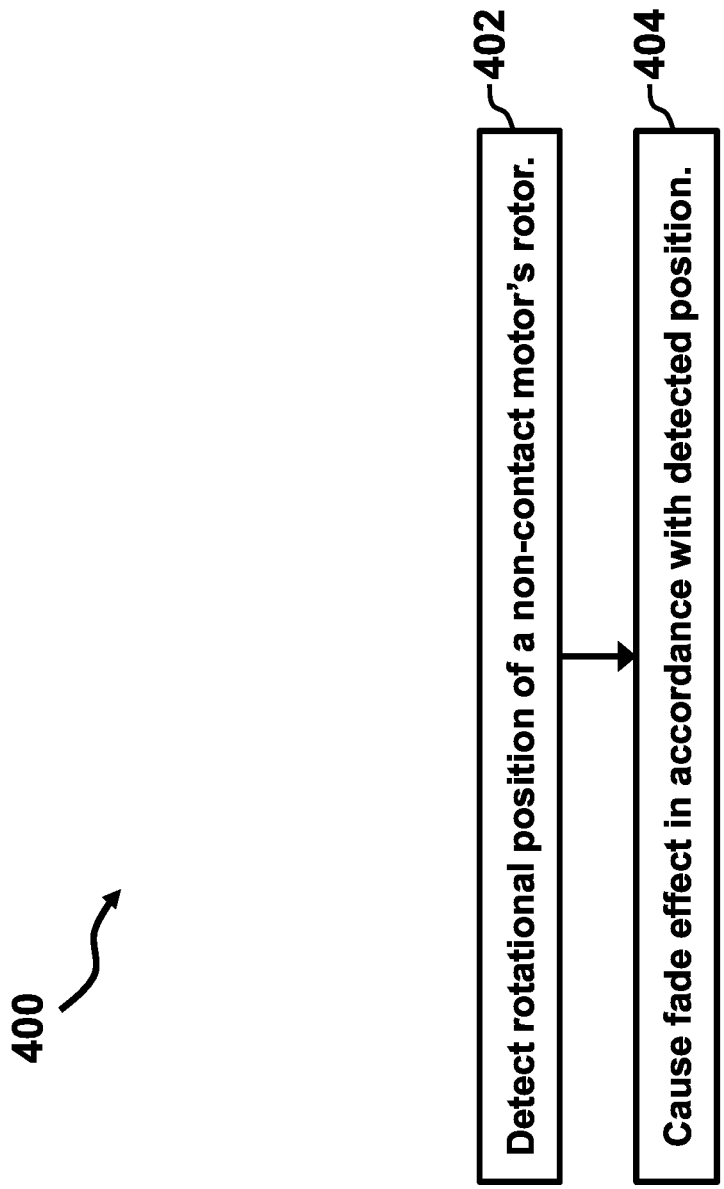
FIG. 4 is a flowchart showing process steps for operating the rotary fader of FIG. 1 according to one exemplary embodiment.
Figure 5:
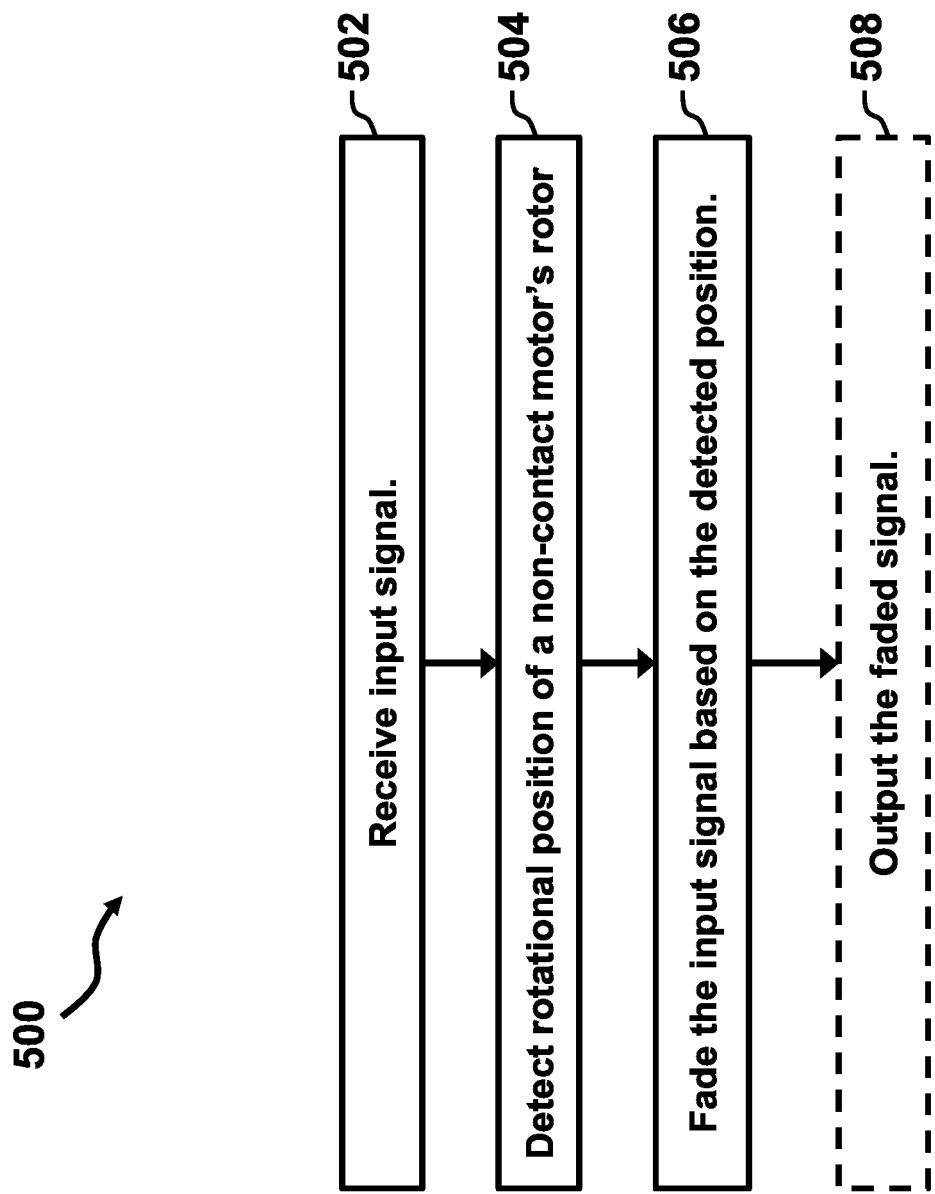
FIG. 5 is a flowchart showing process steps for operating the rotary fader of FIG. 1 according to another exemplary embodiment.
Figure 6:
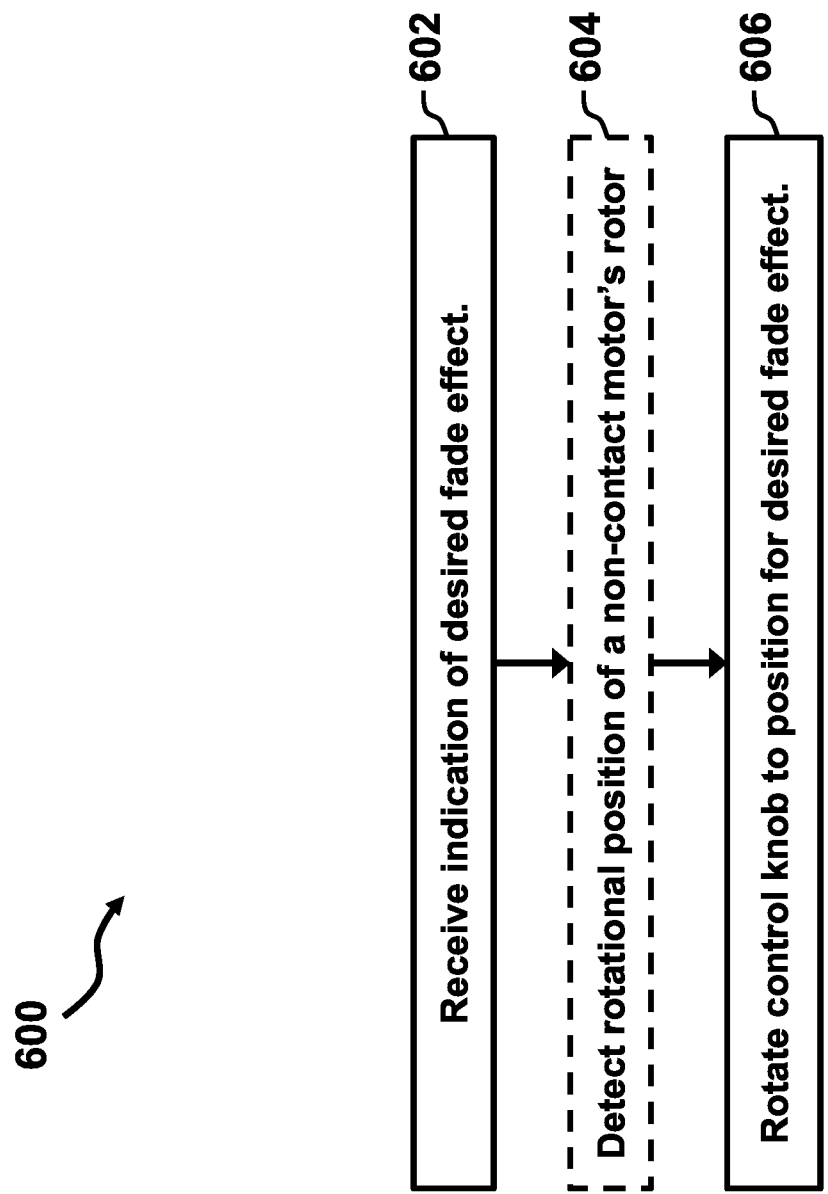
FIG. 6 is a flowchart showing process steps for operating the rotary fader of FIG. 1 according to yet another exemplary embodiment.
Figure 7:
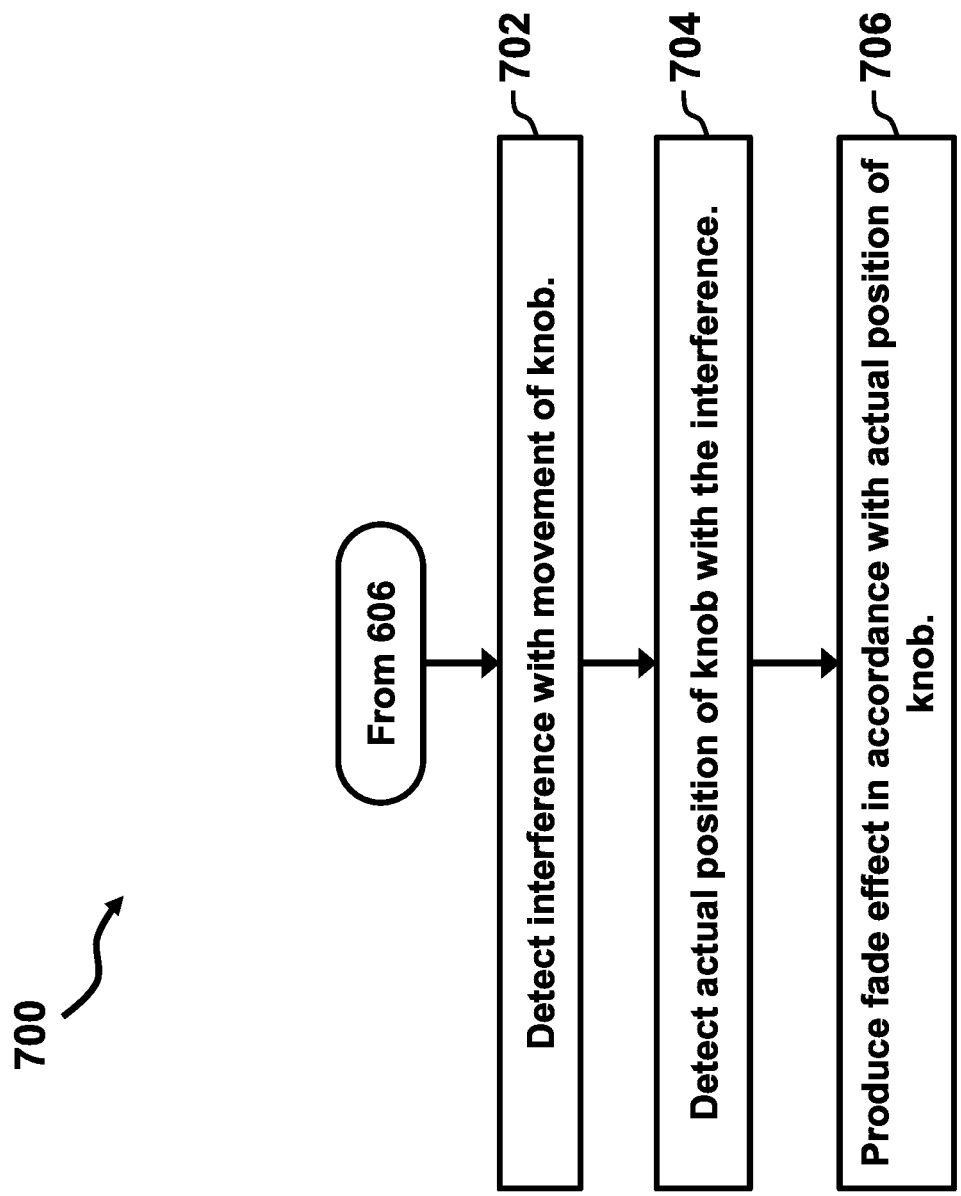
FIG. 7 is a flowchart showing exemplary process steps that may be performed in combination with the process of FIG. 6.
Figure 8:
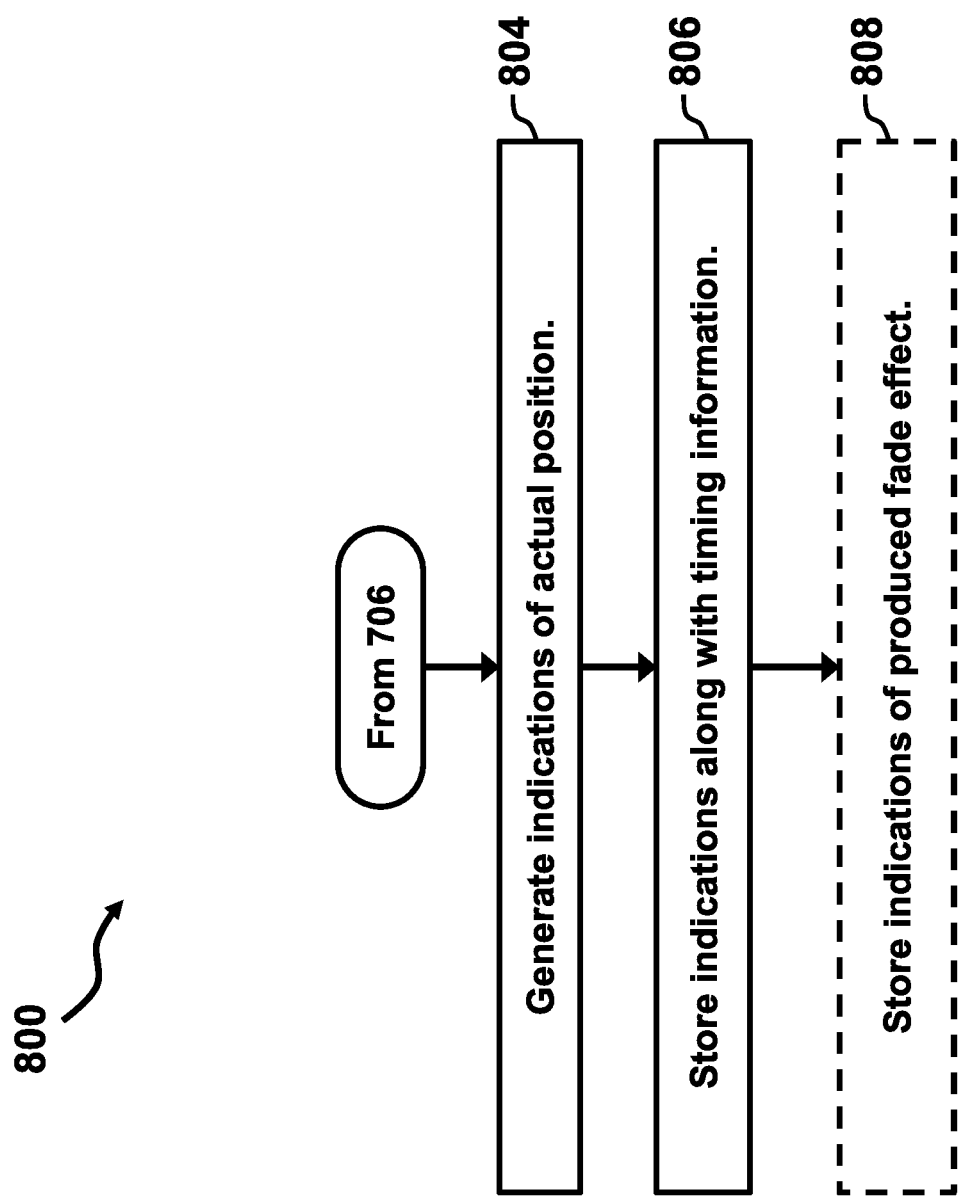
FIG. 8 is a flowchart showing exemplary process steps that may be performed in combination with the process of FIG. 7.

Turning now to FIG. 3, a block diagram illustrating elements related to functional components of a rotary fader 300 is shown, in accordance with at least some embodiments of the present disclosure. In addition to the components described in FIG. 1, the rotary fader 300 may include a processor 302, electronic storage 304, rotational position sensors 308, translational position sensors 310, and communication interfaces 312, all communicatively connected through bus 314. Certain data elements may also be considered part of the rotary fader 300 either because these elements are physically stored or received as non-transitory media, or because the rotary fader affects them in a physically measurable way. For example, FIG. 3 shows program instructions 306, input signal 316, output signal 318, and control input 320 as elements that are a part of, or associated with, the rotary fader 300. Although signals like the input signal 316, the output signal 318, and the control input 320 are likely dynamically varying electrical properties, they are still physical signals that represent other tangible properties (such as sound waves or controller positions).

The processor 302 may include any processor type capable of executing the program instructions 306 in order to perform the functions described herein. For example, the processor 302 may be any general-purpose processor, specialized processing unit, or device containing processing elements. In some cases, multiple processing units may be connected and utilized in combination to perform the various functions of the processor 302. In at least some embodiments, the processor 302 may be a Piccolo microcontroller by Texas Instruments Inc., although other types of microcontrollers and/or processors may be used in other embodiments.

The electronic storage 304 may be any available media that may be accessed by the processor 302 and any other processing elements in the rotary fader 300. By way of example, the electronic storage 304 may include RAM, ROM, EPROM, EEPROM, NAND-based flash memory, CD-ROM, Bluray, or other optical disk storage, magnetic disk storage or other magnetic storage devices, or any other medium that may be used to carry or store desired program code in the form of program instructions or data structures, and which may be executed by a processor. In some cases, the electronic storage 304 may, in some cases, include computer-readable media (CRM). When information is transferred or provided over a network or another communications connection (either hardwired, wireless, or a combination of hardwired or wireless) to a machine, the machine may properly view the connection as a type of electronic storage. Thus, any such connection to a computing device, processor, or control circuit is properly termed electronic storage (or CRM if the signal is readable by a computing device). Combinations of the above are also included within the scope of computer-readable media.

The program instructions 306 may include, for example, instructions and data capable of causing a processing unit, a general-purpose computer, a special-purpose computer, special-purpose processing machines, or remote server systems to perform a certain function or group of functions. These instructions need not be digital or composed in any high-level programming language. Rather, the program instructions 306 may be any set of signal-producing or signal-altering circuitry or media that are capable of preforming function such as those described in the example methods in this disclosure.

As described above, the rotational position sensors 308 and the translational position sensors 310 may include various types of contact and non-contact detection devices, actuate-able interfaces, and/or computing systems. In some cases, these positions/movements may be measured by separate devices or systems. In other cases, some or all of the functions associated with the rotational and the translational position sensors 308 and 310, respectively, may be performed by the same devices or systems.

For simplicity, the bus 314 is shown in FIG. 3 as a single connection between all elements. However, elements in an exemplary system may connect through a variety of interfaces, communication paths, and networking components. Connections may be wired, wireless, optical, mechanical, or any other connector type. Additionally, some components that are shown as directly connected to through the bus 314 may actually connect to one another only through some other element on the bus.

The communication interfaces 312 may include, for example, wireless chipsets, antennae, wired ports, signal converters, communication protocols, and other hardware and software for interfacing with external systems. For example, the rotary fader 300 may receive text, audio, executable code, video, digital information or other data via the communication interfaces 312 from remote data sources (e.g., remote servers, internet locations, intranet locations, wireless data networks, digital audio databases, etc.) or from local media sources (e.g., external drives, memory cards, specialized input systems, wired port connections, wireless terminals, microphones, speakers, etc.). Example communication networks include Public Switched Telephone Network (PSTN), Public Switched Data Network (PSDN), a short message service (SMS) network, a local-area network (LAN), a voice over IP (VoIP) network, a wide area networks (WAN), a virtual private network (VPN), a campus area network, and the Internet. An example network may communicate through wireless, wired, mechanical, and or optical communication links. Many other communication networks may also be suitable for the embodiments discussed herein.

Furthermore, the communication interfaces 312 may include user-interfaces to facilitate receiving user-input and user-commands into the rotary fader 300 and outputting information and prompts for presentation to a user. Although the user-interfaces of the communication interfaces 312 typically connect with human users, these user-interfaces may alternatively connect to automated, animal, or other non-human "users." Additionally, while input and output are described herein as occurring with a user present, the user-interfaces need not present information to any actual user in order for present functions to be performed. User-input may be received as, for instance, wireless/remote control signals, touch-screen input, actuation of buttons/switches, audio/speech input, motion input, lack of interaction for a predefined time period, and/or other user-interface signals. Information may be presented to the user as, for instance, video, images, audio signals, text, remote device operation, mechanical signals, media file output, etc. In some cases, separate devices may be operated to facilitate user-interface functions.

The rotary fader 100, 300 may include many other features in accordance with various embodiments. For instance, some embodiments may include a dedicated power source, not shown. In practice, such a power source may include batteries, capacitors, generators, transformers and/or other power providing sources. Other embodiments may include power-connecting interfaces that are operable to communicate power from external power sources to elements in the rotary fader 100, 300. As another example, the rotary fader 100, 300 may include external protective surfaces or casing to enclose various parts and devices in the rotary fader. As yet another example, the rotary fader 100, 300 may include equipment that monitors the functions and state of the rotary fader itself, to check for malfunction. Further, sensors may also be affixed on, or near, the fader control knob 102 in a position at which the sensors may detect the presence of a user's hand for a number of potential benefits described in the next section.

II. Example Operation

Functions and procedures described in this section may be executed according to any of several embodiments. For example, procedures may be performed by specialized equipment that is designed to perform the particular functions. As another example, the functions may be performed by general-use equipment that executes commands related to the procedures. As a further example, each function may be performed by a different piece of equipment with one piece of equipment serving as control or with a separate control device.

FIGS. 4-10 illustrate methods according to example embodiments. Although the figures show a specific order of method steps, the order of the steps may differ from what is depicted. Also, two or more steps may be performed concurrently or with partial concurrence. Such variations may depend on the software and hardware systems chosen and the specific embodiment. All such variations are within the scope of the disclosure. Likewise, software implementations may be accomplished with standard programming techniques with rule-based logic and other logic to accomplish the various connection steps, processing steps, comparison steps and decision steps.

At block 502, method 500 includes receiving an input signal, such as the input signal 316. In some cases, the input signal 316 may be stored in the electronic storage 304 of the rotary fader 300 and received by the processing elements through the bus 314. In other embodiments, the input signal 316 may be received via the communication interfaces 312 from local or remote sources. The input signal 316 may be received in any format or encoding and, therefore, may be translated or reformatted by the rotary fader 100, 300 (or an element communicatively connected to the rotary fader) prior to being altered by the rotary fader.

The input signal 316 may include any of various signal types. For example, the input signal 316 may include audio, video, electrical current, optical, and/or visual signals, in addition to other signal types. In some cases, multiple ones of the input signal 316 may be received and altered by the rotary fader 100, 300. For example, if the rotary fader 100, 300 receives four video signals that are to be mixed together, the rotary fader may assign a translational position of the rotary fader to each of the signals so that the user may move the rotary fader to the assigned position when they desire to alter the respective signal associated with the position. As another example, the rotary fader 100, 300 may be used to mix together two audio signals by assigning a direction of rotation to each signal so that a user may make one signal more prominent than the other by turning the fader control knob 102 in the direction assigned to the desired signal and vice versa. The rotary fader 100, 300 may also receive signals that combine more than one type of media (such as a corresponding audio and video signal for a single scene) that are to be faded jointly or separately. Signals may be received all at once and then edited using the rotary fader 100, 300 or the signal may be streamed to the rotary fader one piece at a time.

At block 508, the method 500 involves outputting an output signal that has been faded according to some set of procedures. The output signal, such as the output signal 318, may include all of the features discussed above with respect to the input signal 316. In particular, the output signal 318 may be any of the signal types and may include multiple signals or a single signal. The output signal 318, in some embodiments, may include a different number of signals than the input signal 316 (e.g., because the signals are mixed together into fewer signals). However, the output signal 318 may typically only include media types equivalent or substantially equivalent to the types of the input signal 316. The output signal 318 may be transmitted in the same way that the input signal 316 is received and may be processed after being faded, for instance, to comply with formatting or encoding requirements.

At blocks 402, 504, and 604, methods 400, 500, and 600, respectively, include detecting the rotational position of a non-contact motor's rotor. Block 704 of method 700 includes detecting a position of the fader control knob 102. As described above, the detection of the position of the rotor 106, 208 and the position of the fader control knob 102, may be performed by various sensors and devices. Although position of the rotor 106, 208 may be directly detected as the rotor position and/or the position of the fader control knob 102 (in some embodiments), the detected position may be considered a single knob/rotor position because of the direct connection between the fader control knob and the rotor. In embodiments where some or a significant amount of flexing, bending, or gap allows the position of the rotor 106, 208 to be significantly different from the position of the fader control knob 102, the rotary fader 100, 300 may detect one position and use it as the position of interest for the rotary fader.

In some embodiments, position detection (of the rotor 106, 208 and/or the fader control knob 102) may be performed on a periodic basis (e.g., once a minute, 10 times per second, 20,000 times per second, etc.) to provide a set of position values ranging in specificity from very occasionally to real-time streaming. In other embodiments, the position detection is only performed in response to particular stimuli (e.g., motion detected, contact of the user with the fader control knob 102, input audio signal detected, both input and motion detected, etc.). In still other embodiments, the detection may be performed on a passive basis, with the rotary fader 100, 300 constantly detecting position information, even when the information is not being used. Additionally, in some embodiments, the rotary fader 100, 300 may combine both periodic and responsive detection processes to yield a more complete result. For instance, the periodic position detection may start with one rate when neither user-presence nor input signal is detected and then increase to faster periodic rates when one or both of these stimuli are detected.

In some embodiments, the position of the rotor 106, 208 and/or the fader control knob 102 may be measured only as the result of detected movements. For example, if the rotor 106, 208 is moved 60° from a start position, then a sensor may detect only the movement of the rotor and infer the final position of the rotor by adding 60° to the start position. In other embodiments, the position of the rotor 106, 208 and/or the fader control knob 102 may be measured directly whether or not the sensor was aware of the rotor's previous position and without the necessity of movement. For example, the rotor 106, 208 may have certain markings that are indicative of the absolute value of the rotor position, rather than a relative movement value, and that are detectable to the sensors (e.g., tiny variations in the magnetic structure of the rotor may be measured by comparing Hall sensor signals to factory preset levels). In embodiments where the rotary fader 100, 300 may be purposefully turned farther than 360° (i.e., the fade-effect continues to change after the first revolution of the fader control knob 102 in a similar way as before the first revolution is completed), the rotary fader may track the number of revolutions even if the position is tracked directly by the sensors.

For Hall-effect sensors, the position may actually be tracked as relative polarity of the rotor 106, 208 (north or south) in combination with the number of times that the polarity has transitioned. Therefore, a full revolution of the rotor 208 in FIG. 2 may produce six peaks and six valleys in the detected position signal from each sensor, with each peak or valley corresponding to either a north or south polarity of the rotor from the perspective of the coil(s) associated with the sensor. Hence, the size of a change in position may be counted as the number of peaks times the value of each peak (for 12 poles, 60° or $\pi/3$ radians) plus the phase difference between the original position and the final position. Hall sensors may be used in tracking translational movements of the fader control knob 102, the shaft 104, and/or the rotor 106, 208 as well. For example, if the rotor 106, 208 were moved away from the sensors (e.g., in a downward direction on FIG. 1), then the magnetic field at all of the Hall sensors may reduce, which may not be typical for rotational movements. Therefore, by tracking correlated changes in multiple Hall sensors, the rotary fader 100, 300 may track translational movements without making mechanical contact with the moving parts of the rotary fader.

In at least some embodiments, the angular position control of the rotor 106, 208 may be achieved by using open-loop or closed-loop mechanisms. For example, in an open-loop mode, a drive vector of sufficient magnitude to move the rotor 106, 208 may be applied to the stator coils 108 of the stator 206. By virtue of applying the drive vector, the rotor 106, 208 may move its electrical phase into an alignment with the drive phasor. On the other hand, in a closed-loop mode, variants of proportional, integral and derivative (PID) control may be applied with tuning constants such that an angle of the rotor 106, 208 may be driven in a rapid and stable trajectory. In at least some embodiments, a combination of the open-loop and the closed-loop modes may be implemented as well.

At blocks 404, 506, and 706, the methods 400, 500, and 700, respectively, include producing a fade effect in accordance with a detected position of the rotor 106, 208 or the fader control knob 102. The fade effect may be any signal processing that is tunable by the rotary fader 100, 300. For example, if the input signal 316 is an audio signal, the fade effect may alter the amplitude, frequency, phase, timbre, echo, sampling characteristics, speed, equalization, reverb, reverse echo, noise properties, carrier wave dynamics, or beating of an input audio signal, in addition to various other techniques and characteristics. As another example, if the input signal 316 is a video signal, then the fader effect may facilitate changing the spectral characteristics, coherence, brightness, tone, sharpness, contrast, sampling rate, density, proportion, or position of the video signal. As still another example, if an electrical input signal is applied to the rotary fader 100, 300, then the fade effect may change the voltage amplitude, current amplitude, voltage frequency, waveform, phase, current frequency, dispersion, or DC offset of the signal. For other types of the input signal 316, different fader qualities may be used. In some embodiments, a "fader" may only be considered an audio fading device. In other embodiments, the "fader" may be limited to a single different application.

The altered property of the input signal 316 may be either discrete (i.e., varying at a certain number of perceptible levels) or continuous (i.e., varying at a near-imperceptible fineness between levels, rather than conforming to larger discrete levels). For discrete properties, each level of the varied property may be associated with a particular range of rotational positions. For example, if the altered property only has a single value representing an "on" state and a single value representing an "off" state, then the rotary fader 100, 300 may (i) designate a central rotational position, (ii) turn off the fade effect when the rotor 106, 208 is turned counterclockwise from the central position and (iii) turn on the effect when the rotor is turned clockwise from the central position. As another example, if the altered property of the input signal 316 may only vary at ten particular levels, then a certain arc of movement (for example, one full rotation) may be divided into ten ranges, with the range in which the rotor 106, 208 is positioned being used as a trigger for activating one of the levels of the property.

For continuous properties, the program instructions 306 or circuitry may associate the property value with the rotational position in accordance with some mathematical function. To determine such associations, the rotary fader 100, 300 may receive an indication (or calculate from known system limitations) of the maximum and minimum levels of the fade effect that may be produced by the rotary fader. For example, if the faded property were signal amplitude and the input signal 316 was represented by an analog electrical voltage, then the maximum value of the rotary fader 100, 300 may be the highest voltage attainable (e.g., the saturation level of the operational amplifiers in the rotary fader) and the lowest value may be the lowest measurable voltage (e.g., the turn-on voltage of the transistors). Then, the rotary fader 100, 300 may generate a range-scaling formula that associates the potential range of values to the range of some rotational position arc (either predetermined or dynamically allocated). Continuing the analog amplitude example, if the rotary fader 100, 300 designates two rotations of the fader control knob 102 (i.e., 720° or $4\pi$ radians) as the movement range, then the scaling formula may be determined by taking a template function and assigning the scalars so that the minimum analog voltage is associated with some zero position and the maximum level is associated with a position 720° beyond the zero position, in the direction designated for increasing amplitude (e.g., clockwise). Then, when the rotary fader 100, 300 is producing the fade effect, the rotational position may be fed into the scaled function and the level of fading for the property may be taken from the result of the function.

In some embodiments, a continuous property may be cast as a discrete property by assigning a smaller number of levels to the rotary fader 100, 300. For example, an analog amplitude level may be converted to a digital signal during processing, such that only the discrete digital levels are representable. However, in such an embodiment, the number of discrete steps may be chosen so that the stepping is imperceptible to a user. In other embodiments, a continuous variable may be divided into perceptibly large levels to be controlled by the rotary fader 100, 300.

In some embodiments, the fade effect may be produced continuously while the input signal 316 is being received. For example, one or more audio signals may be continuously changed to allow a user to hear the effect of changes made to the signals, either independently or mixed together, or alternatively, to see the effects to a visual signal, while they are being tuned. In other cases, the fade or mix effect may be performed only when detected user-interactions indicate an intent to alter the signal. For example, the fade effect may only be activated while a fade-on switch or button is actuated. As another example, the presence of a user-hand on the fader control knob 102 may be detected (e.g., by heat, proximity, or pressure sensors on knob 102) and used as a trigger for turning on or off the fade effect. In another aspect, the duration of a fade effect may be specified prior to the input signal 316 being fully received, presented to the user, or cued up for fading. For example, when a user finds a certain "sweet spot" of fading for a track or signal, the user may assign that fading level to the input signal 316 for a time range after or before the portion of the signal that is currently being presented to the user (e.g., the rest of the track or the whole track, including preceding and forthcoming portions). In particular, the rotary fader 100, 300 may record an indication of the part of the input signal 316 that was presented when the fade-effect begins to be altered (e.g., fader control knob 102 is moved) and, once an acceptable level is attained, use that level (with a reasonable build-up) for a range of time that begins at the indicated part of the signal.

At block 602 of the method 600, the method involves receiving an indication of a desired fade effect. In this and other contexts herein, the term "desired" is used as an indication of a prescribed, intended, or selected condition or level that is to be produced by the apparatus. However, the term should not be interpreted as requiring actual desire or want on the part of a user, artist, viewer, or other entity. Rather, the "desired" state of an apparatus is the state that the apparatus is being controlled to produce, whether or not that state is desired or expected by a user or operator.

In the context of the block 602, the desired fade effect may be a stored (e.g., stored in the electronic storage 304, and/or a database in communication with the rotary fader 100, 300) fade-effect level that the rotary fader 100, 300 has been instructed to produce. In some embodiments, the stored level may be a fade level that was previously tuned by a user of the rotary fader 100, 300 or a connected system. For example, the rotary fader 100, 300 may record a sequence of fade effects that a user tunes while the track is being recorded. The user may then play the track back including the sequence of fade effects. Therefore, the fade effect levels may be recorded as a level (or a position of the control knob associated with that level) along with a corresponding timestamp for the range over which the level is applied (or indications of which portion of the signal is contained in that range). Then, in reproducing the input signal 316 with the added effects, the rotary fader 100, 300 may synchronize the recorded sequence of fade levels with the received input signal to produce the playback. Such a process may be useful so that the user may further fine-tune the fade effects upon hearing the playback.

As with other signals, the desired fade level (e.g., control input 320) may be received by a component of the rotary fader 100, 300 via any of various interfaces, connections, and protocols. In some embodiments, the received control input features only the desired levels and timing signals. In other embodiments, the rotary fader 100, 300 may receive rotor position specifications with the timing information, rather than an indication of how the rotor position affects the signal. In still other embodiments, the control input 320 may be received as levels of stator current that are capable of moving the fader control knob 102 to the desired position. Further, some control signals may be generated in a processing system, either in the fader or coupled to the rotary fader 100, 300, which receives the input signal 316. For example, the processor 302 may be configured to recognize specific patterns in the input signal 316 and, in response to recognizing the pattern, automatically tune the rotary fader 100, 300 to a particular level. Such a recognizable pattern may be a volume range, a frequency range, a change in volume or frequency, a frequency profile, or a change in frequency profile; and may be detected by a signal processor in a processing system. In a mixing application, the rotary fader 100, 300 may be programmed or configured to respond to patterns in one or both tracks (including patterns in comparisons, correlations, or other aggregate features) and alter the fade effect on each track in accordance with the pattern recognition. In this way, dynamic changes detected in one track may be used to change the fade levels in another track.

At block 606, the method 600 includes rotating the fader control knob 102 to a position associated with the desired effect. In an example embodiment, the motor 200 may be used to provide rotational force through the rotor 106, 208 and the shaft 104 to control the fader control knob 102. To do so, an electrical current of varying phase may be applied to the stator coils 108 of the stator 206 of the motor 200. In particular, three-phase current may be input into stator coils 108 of the stator 206 in such a way that the induced magnetic fields either oppose or attract portions of the rotor 106, 208. When the rotor 106, 208 achieves a magnetically-stable position, the current may be changed so as to rotate that stable position. In minimizing potential energy for the rotary fader 100, 300, the rotor 106, 208 may then follow the stable position in an electrically controllable pattern. Thereby, the rotary fader 100, 300 may turn the fader control knob 102 to any position by changing electrical current impulses through the stator coils 108. To increase the precision or stability of knob positioning, various monitoring/regulating mechanisms may be used on the control signal, such as proportional-integral-derivative (PID) controllers or other feedback systems.

Further, the rotary fader 100, 300 uses the received desired fade effect in the block 602 as a controlling input for determining to which position to rotate the fader control knob 102 to. For example, if the desired effect was recorded as a user-input to the rotary fader 100, 300 (either in the same rotary fader or a different rotary fader setup), then the fader control knob 102 may be rotated to a position that is roughly the position of the fader control knob when the effect was first recorded. As another example, the rotary fader 100, 300 may determine positions that may be associated with the desired fade-effect either by assigning discrete fade levels to particular position ranges of the rotor 106, 208 and/or the fader control knob 102, or by generating a function that associates a given amount of fade with a mathematically calculable position. As yet another example, the rotary fader 100, 300 may be configured to react to the movement of another fader, so that one or more faders may mirror, track or invert the movements of another. Once the controlling function (either discrete or continuous) has been generated, the sequence of desired fader levels may be converted to a sequence of rotor positions, and used to move the rotor 106, 208 and the fader control knob 102 to the positions associated with the desired effect(s).

However, as stated above, one potential use of such an automated playback of fader levels is to facilitate changes to the fade level based on newly detected user-input. Accordingly, block 702 of the method 700 includes detecting interference (e.g., by a user) with the movement of fader control knob 102. In context, the movement of the fader control knob 102 is induced by the current in the stator 206 in the motor 200 in accordance with a desired fade level. Accordingly, a user-interference of the movement may be an indication that the fade level should be changed in the recorded sequence of fade effects. Hence, the user-interaction may be treated as overriding, so that the fade effect that is played by the rotary fader 100, 300 may be associated with the position that the rotary fader is actually occupying, rather than the recorded fade level. In order to ensure that the user is able to interfere effectively, the torque of the motor 200 may be relatively weak in comparison to a user's strength. In some cases, this may be achieved by always applying a relatively low torque to the motor 200. In other embodiments, the rotary fader 100, 300 may detect the presence of a user-hand in proximity to the fader control knob 102 and, in response, temporarily lower the torque applied to the motor 200.

Further, since the user-interaction may indicate that the recorded fader level be changed, an example method 800 may include generating indications of the actual position of the control knob (block 804) and storing those indications along with timing information associated with the actual positions (block 806). In some cases, the new fade-effect levels or fader positions may be stored in databases in place of the original fade levels (i.e., over-writing the original recorded sequence of effects). In other cases, the new fade effects may be recorded in a separate sequence of fade effects (along with the original fade effects whenever the user did not interfere with the levels). In addition to storing the position information for the rotor/knob, the system may optionally also record indications of the fade effect that was produced by the fader in accordance with the new position (block 808).

In another aspect of the present disclosure, the fader control knob 102 that is tied directly to the motor 200 may facilitate producing a unique "feel" for the movement of the fade control knob. As discussed above, the gears, pulleys, connections, and motor friction may cause linear faders to feel coggy or gritty. However, by connecting the fader control knob 102 directly to the rotor 106, 208 of the motor 200, a majority of the physical feel of the rotary fader 100, 300 may be removed. Therefore, without any torque added by the motor 200, the fader control knob 102 may glide easily with very little friction when rotating. It should be noted that the motor 200 may be a non-contact motor that may still use some structures that make contact with the rotor/shaft assembly for mechanical support. However, such structures may be very low friction (e.g., through bearings, lubricants, coatings, rollers, etc.) so as to be imperceptible to a user.

Nevertheless, it may be desirable to add some torque by the motor 200 in order to improve the way that the fader control knob 102 feels when turned, among other advantages. Accordingly, the torque of the motor 200 (in either direction) may be utilized to oppose movement of fader control knob 102 in order to produce a particular feel effect. For example, in one implementation, the motor 200 may be configured to provide torque that resists all movement of the fader control knob 102 by generating a certain (potentially quite small) opposing force on the fader control knob. In this way, a user may feel that the fader control knob 102 is being resisted in a natural way. In addition to providing a single continuous level of torque, the motor may 200 alternatively provide torque to cause the force applied to the fader control knob 102 to vary with time, speed of rotation, or position so that force feels more natural and less manufactured than a continuous never changing force. For example, a viscous feel may be provided when a small amount of force is applied in opposition to the direction of rotation, in proportion to the speed of rotation.

Specifically, a variable viscous component to the tactile feel of the fader control knob 102 may be desirable for preventing abrupt movements and improving the ability of a user to more accurately fine-tune. The non-contact nature of the stator-support unit and the rotor-knob unit, as discussed above, may facilitate a viscous feel effect. In addition, dampers, whether mechanical, electrical (such as, via magnetic coupling), or a combination of electrical and mechanical, may be added to achieve a viscous feel effect. In at least some embodiments, the term "viscous" or "viscosity" may be defined as a resistance/force proportional to movement. An estimate for angular velocity may be used to produce a viscous feel by adding a torque component in opposition to the direction of rotation of the rotor 106, 208, in proportion to the speed thereof. Particularly, the angular velocity for enhancing the feel of the control may be based on taking differences between Hall angle sensor samples with reference to the number of samples between them, and filtering to mitigate the effects of noise and producing a digital angular velocity signal.

In some embodiments, provided force on the fader control knob 102 by the torque on the motor 200 may even include negative force (i.e., the motor pushing in the direction of rotation). However, the very low friction of the rotary fader 100, 300 may make such force unnecessary in most applications.

Figure 9:
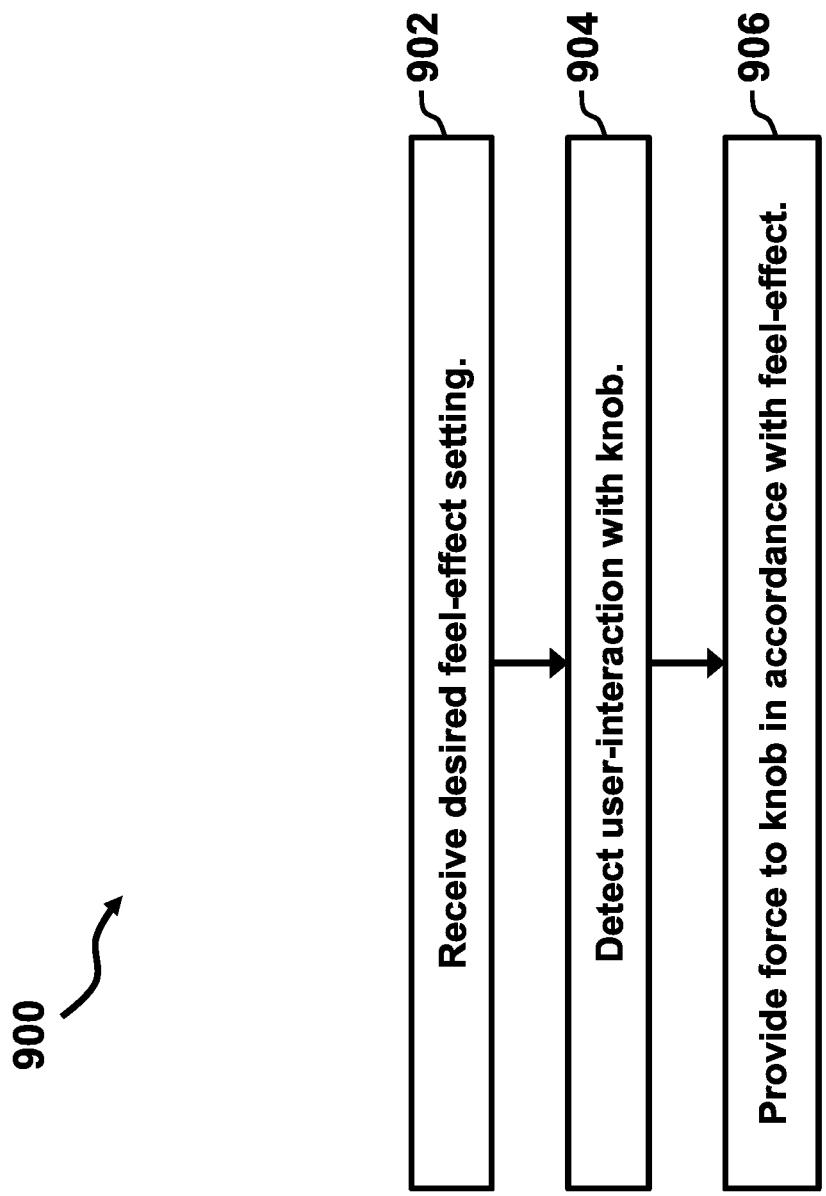
FIG. 9 is a flowchart showing process steps for operating the rotary fader of FIG. 1 according to another exemplary embodiment.
Figure 10:
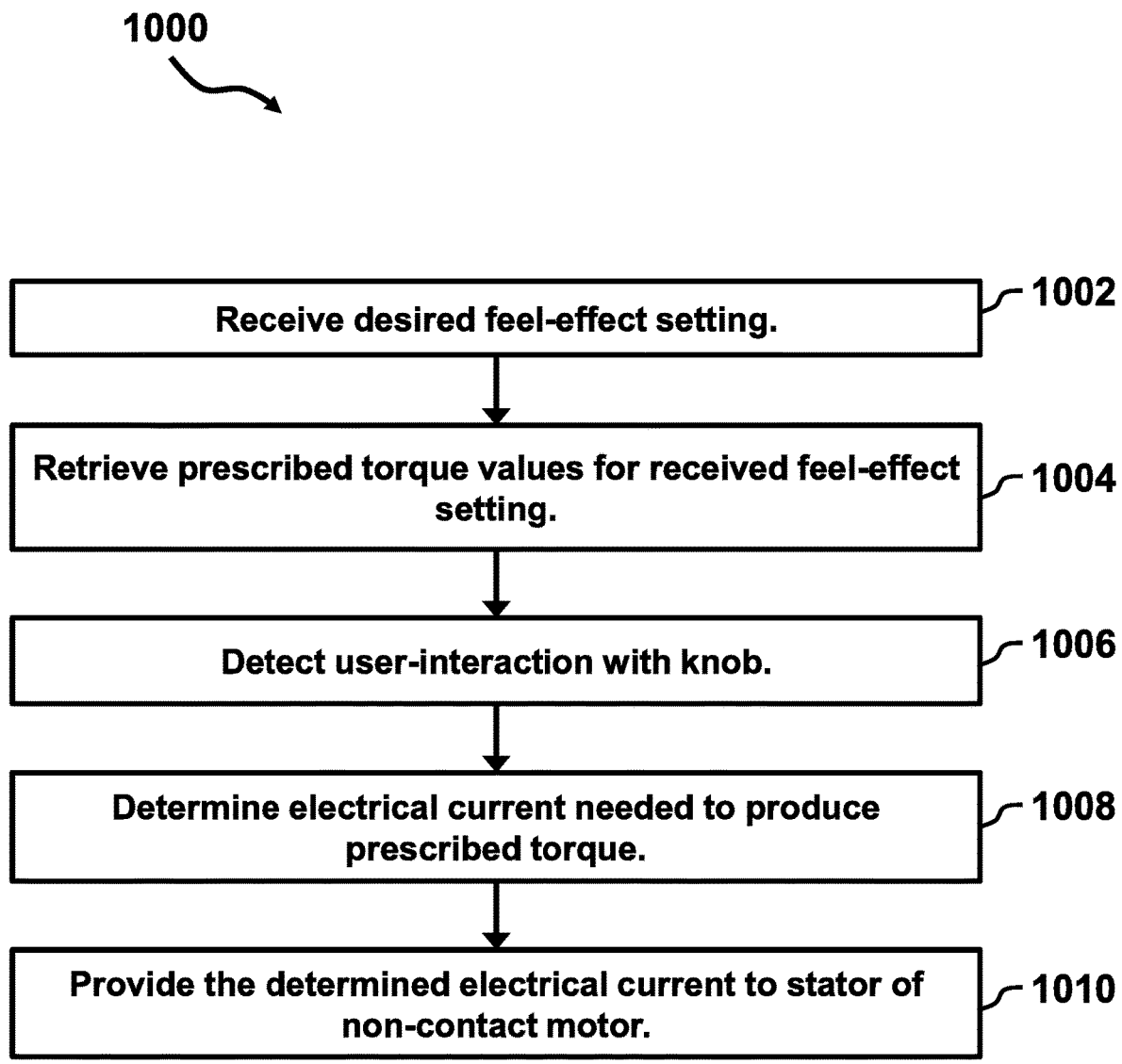
FIG. 10 is a flowchart showing process steps for operating the rotary fader of FIG. 1 according to still another exemplary embodiment.

Turning now to FIGS. 9 and 10, methods 900 and 1000 show example procedures that may be used in producing such an effect. As shown, the methods 900 and 1000 involve receiving a desired feel-effect setting at blocks 902 and 1002, respectively. The feel setting may be instructions for producing the desired feel-effect or it may simply provide a label for the feel-effect, for which procedures may be located through, for example, reference to a hash table that includes feel labels and associated procedures (block 1004). At blocks 904 and 1006, the methods 900 and 1000 involve detecting user-interaction with the fader control knob 102. Since the feel-effect may relate to the way the fader control knob 102 feels in motion, the rotary fader 100, 300 may benefit from detecting the presence and characteristics of the user-interaction. In particular, some procedures may include different torque values for different speed or acceleration values for the fader control knob 102. For example, if the desired feel-effect includes an indication of a desired level of perceived inertia for the fader control knob 102, then more torque may be applied to the motor 200 in response to a larger acceleration. Such torque values may be calculated in accordance with the physical laws that govern the motion of objects with the particular inertia that is to be perceived.

Other feel effects may include the perception of friction, viscosity, virtual mass, dual-mode via push button, stabilization (e.g., with PID or other feedback), a programmable texture, superposition, buzzing, end-stops notches, notch density, notch depth, moving notches, changing notches (to appear or disappear), an audible "tick" produced by pulsing the motor to simulate a (virtual) metallic mechanical stop, and a simulated spring load (substantially arbitrarily applied/simulated over any given range for the angular position of the fader control knob 102). As one example, a buzzing may be used to indicate that a limiting state has been reached by the rotary fader 100, 300 or that some problem is occurring. For instance, the buzzing may occur when the rotary fader 100, 300 is turned too high. Buzzing or other tactile responses may also alert the user to changes or issues with the incoming signal (e.g., signal level too high, signal is garbled, signal has ended, etc.) Similar tactile feedback may be provided to alert a user about any of various state changes in the signal, the rotary fader 100, 300, or another connected component (e.g., an audio mixer).

Some of the feel effects may fit into a category of "haptic" feedback, in which the force is perceived as a mechanical artifact of the rotary fader 100, 300, though it is actually produced by electronic motor controls. For example, the rotary fader 100, 300 may simulate the feel of notches at different rotational positions by resisting movement away from the set of stable positions associated with the notches, while providing less opposition to movement between notches. Because the notches may be virtual, however, they may be moved and altered in both location, number, and perceived depth (the amount of opposition to movement away from the stable positions) depending on system state, as discussed above. As another example, a mechanical "tick" sound, coupled with an end-stop (e.g., a positional threshold beyond which any further movement is greatly resisted by the motor), may provide the perception of the fader control knob 102 encountering a mechanical barrier at the end of the fader control knob's rotation path. As a further example, a spring-loading effect may be produced by providing a uni-directional (in one rotational direction but not the other) torque to the fader control knob 102 that may increase as the fader control knob moves away from a particular stable position. As still another example, a small buzz may be provided when the rotary fader 100, 300 is moved in a translational manner, to communicate that movement has been recognized and make the movement feel more realistic.

In at least some embodiments, current in the motor 200 (e.g., current through the stator coils 108 of the stator 206) may be set to zero when the desired feel effect involves no user interaction with the fader control knob 102 and/or when the fader control knob is not being driven to a new position. Such a temporary disabling of the motor 200 may extend the power/battery life of the motor. Furthermore, the rotary fader 100, 300 may be designed such that the haptic features, discussed above, may instantly or substantially instantly turn on (e.g., faster than a human may perceive) the motor 200 upon touching the fader control knob 102. Such tactile sensing of the fader control knob 102 to turn the motor 200 on may be accomplished by using capacitive coupling and/or by sensing minute fluctuations in the Hall-sensor outputs, as discussed above. Fluctuations determinable by the Hall-sensors may occur due to vibrations that may be caused by the presence of the user's fingers on the fader control knob 102.

Therefore, such power-save features may be used to extend the battery life of the motor 200 and/or reduce power consumption of the rotary fader 100, 300. These power-save features may also be beneficial in reducing electromagnetic emissions (EMI emissions). Specifically, the motor driver chips responsible for providing pulse width modulated (PWM) signal(s) to each phase of the motor 200 may be disabled, thereby setting PWM outputs to the motor 200 to a high-impedance state, whenever the fader control knob 102 is not being touched by the user or being driven to a new position. In at least some embodiments, the motor driver may be a Texas Instruments motor model number DRV8312, although other motor drivers are contemplated and considered within the scope of the present disclosure.

Once disabled, the fader control knob 102 may essentially be considered released, held only by a minute bearing/bushing friction. The speed of de-activation or re-activation may be accomplished at a sufficient speed so as to render the de-activation/re-activation substantially imperceptible by the user, even when actively using the haptic features. Further, if the motor 200 drives are used to stabilize (hold steady) the fader control knob 102 in response to movement or vibration of the rotary fader 100, 300 itself, the rotary fader may also be disabled if/when the rotary fader is not subject to any form of significant motion/disturbance.

Depending on the implementation, there may be other chips that may also be turned off, such as power supplies, digital signal processors (DSPs) (in a multiple DSP system, where one DSP monitors all Hall sensors) or even the bias current feeding the Hall sensors if an alternative means of sensing touch (such as capacitive touch) is present.

Furthermore, three main methods may be considered to detect touch/motion:

1) Small displacements detected via the Hall sensors—useful to detect the presence of user interaction with the fader control knob 102 or rotation/error with respect to a desired position.

2) Capacitive touch sensing on the fader control knob 102.

3) Placing sensor(s) for the measurement of acceleration or velocity in the rotary fader 100, 300 itself.

Other methods to detect touch/motion may include using infrared reflection or ultrasonic proximity detection for sensing the presence of the user's hand/fingers near or on the fader control knob 102. Such infrared reflection or ultrasonic proximity detection techniques may also advantageously provide some advance notice to the user as the user's hand/fingers approach the fader control knob 102. In other cases, a small amount of back-EMF (or induced back-electromotive force) may be used to detect motion of the rotor 106, 208.

Other haptic, mechanical-mimicking, or other feel effects are contemplated in the present disclosure, although not mentioned specifically. Once the user-interactions are being tracked and the force for the feel effect has been calculated (block 1008), the rotary fader 100, 300 may apply force to the rotor 106, 208, thereby providing a simulated feeling of resistance to the fader control knob 102 (block 906). Since some user-interactions are quick and unexpected, the rotary fader 100, 300 may maintain a certain opposition to motion, even when the fader control knob 102 is stopped and not moving. Additionally, the torque may be provided as a circuit-based (rather than computer based) feedback loop, with the torque being the input, and the detected rotor position being the output and feedback quantity. In any case, the force may be applied by sending electrical current through the stator coils 108 (block 1010).

Figure 12B:
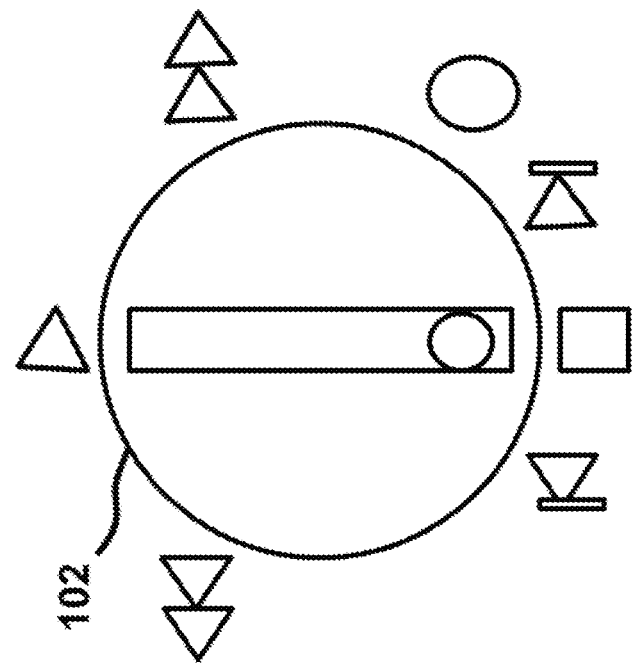
FIGS. 12a and 12b are simplified schematic illustrations, each showing an exemplary configuration of the fader control knob of the rotary fader of FIG. 1 being used as an audio recorder according to another exemplary embodiment.
Figure 12A:
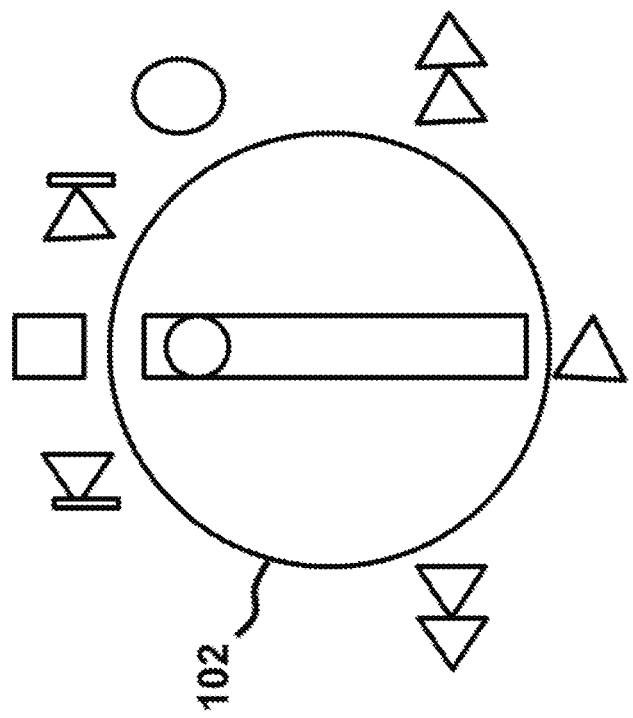

Additionally, in at least some embodiments, the rotary fader 100, 300 may be used as an audio recording system ("audio recorder"). When used as an audio recorder, the rotary fader 100, 300 may cease to operate as a fader, instead operating as an audio recorder that may utilize the contactless construction of the motor 200 for operation. Specifically, in many audio applications, it may be desired to simulate end-stops on the rotation of the fader control knob 102, allowing a user to perceive a mechanical limit to the angular rotation of the fader control knob. In at least some embodiments, these mechanical limits may be placed about three hundred degrees (300°) apart or about one hundred fifty degrees (150°) degrees from either side of top-center. Alternatively, in other embodiments, it may be desirable to place deep notches or spring loading along sections of the angular travel of the fader control knob 102. A spring may be electrically synthesized by applying a torque command that may be linearly ramped over any desired section of the angular travel. For example, these notches or spring loading sections may be used in various modes to activate stop, play, record, next-file, previous-file, fast-forward (FF), and/or rewind (RR) functionality. Two configurations of the fader control knob 102 being used as an audio recorder are shown in FIGS. 12a and 12b. In at least some embodiments, deep notches may be desired at the next-file, previous-file and record settings, while a lighter notch maybe desired at the play location, with spring loading as the distance from play into either FF or RR being felt as a form of feedback as to how fast the FF or RR command commences.

Additionally, the angular position sensing from the Hall sensors, described above, may serve as the input to a state-machine for a device being controlled by the fader control knob 102 used as an audio recorder. Moreover, the inventors have found that the feel of an end-stop once the user forces the fader control knob 102 past the end-stop may be enhanced by adding a viscous component. This viscous component differs from the previously described viscous feature in paragraphs [0076] and [0079]. Specifically, the viscous component when using the fader control knob 102 as an audio recorder may allow the drive magnitude to diminish in a direction of travel back from the end-stop (toward the non-end-stop controlled region).

Advantageously, such a reduction of the angular momentum of the fader control knob 102 may allow for an easier control of the fader control knob and a reduced overshoot into the non-end-stop region upon the return of the fader control knob. Furthermore, in at least some embodiments, the feel of the end-stops of the fader control knob 102 may be enhanced by deactivating all other features when within approximately a few tenths to a few-hundredths of an electrical rotation prior to reaching the end-stop. Such a deactivation procedure may have an effect of making the electrical end-stop (with limitation on the available torque) appear/feel more dramatic.

Moreover, in at least some of those embodiments where the fader control knob 102 controls actuation of the pushbutton 110, as described above, different positions of the pushbutton may be used for controlling the modes (stop, play, record, next-file, previous-file, fast-forward, and rewind) of the audio recorder. For example, in some embodiments, a first position (e.g., either in or out) of the pushbutton 110 may allow a user to implement a first subset of the audio recorder modes (e.g., play, record, next file, previous file), while a second position (again, either in or out) may allow the user to implement a second subset of the audio recorder modes (e.g., fast-forward and rewind). The subset of the audio recorder modes for each position of the pushbutton 110 are merely exemplary. In other embodiments, the modes that may be associated with each position of the pushbutton 110 may vary. Also, in at least some of those embodiments where the pushbutton 110 may be used to implement the audio recorder, the speed of fast-forward/rewinding may be based on an amount of rotation of the fader control knob 102 either forward or backward.

Additionally, the fader control knob 102 may be configured to be interchangeable between the two configurations shown in FIGS. 12*a* and 12*b*. Specifically, the fader control knob 102 may be configured such that a user may switch between the configurations of FIGS. 12*a* and 12*b* at any time. Notwithstanding the two configurations of the fader control knob 102 that are shown in FIGS. 12*a* and 12*b*, other configurations of the fader control knob are contemplated and considered within the scope of the present disclosure. Furthermore, the fader control knob 102 may also be used as a video recording system, instead of or in addition to being used as an audio recording system, as described above.

Thus, the combination of the various features described may provide a more favorable result than merely the sum of the parts. In particular, the geometry of the rotary fader 100, 300 may allow the fader control knob 102 to be directly tied to the motor 200, without the use of gears, pulleys, etc. In combination with the motor 200, which is a non-contact motor, the fader control knob 102 may provide very little opposition to motion, which may be a greater reduction in opposition to motion than would be expected from the sum of the effect of these two features separately. Additionally, the low opposition to motion, either from one or both of the previous features, makes the haptic or "feel" effects reasonably pursuable by reducing the external frictional forces to the point that the motor-produced effects feel realistic. Further still, the other features (e.g., rotary geometry, non-contact rotor, direct connection between the fader control knob 102 and the motor 200, "feel" effects) allow for the motorization/automation of the rotary fader 100, 300 to be more efficient and natural-feeling than with rotary faders that may not include one or more of those features. It should not be construed that the features in this paragraph are the only novel features of in the present disclosure, or that these features are more important or preferable in an example embodiment. Rather, the example features are used to show that the features of the present disclosure produce results that may not be expected by investigating each feature on its own. Therefore, the claimed systems and methods may not be reasonably interpreted as collections of separable elements, but as cohesive embodiments that provide inherent features not observable in the separate elements alone.

Additionally, various modifications to the embodiments described above are contemplated and considered within the scope of the present disclosure. For example, in at least some embodiments, the rotor 106, 208 may be flipped to face the top plate 112 and the fader control knob 102 may be attached to a back portion of the rotor. Relatedly, in other embodiments, the stator coils 108 may be placed outside (e.g., surround), rather than inside the rotor 106, 208.

III. Conclusion

The construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the scope of the appended claims.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An apparatus comprising:
    a control knob moveable to a plurality of positions, each of the plurality of positions associated with a control function; and
    a control circuitry configured to modify an input signal based upon the control function associated with a detected position from the plurality of control positions,
    wherein the control knob is coupled to a rotor and a stator, wherein the stator is moveable to allow the control knob to move between the plurality of positions.
2. The apparatus of claim 1, wherein the control knob is coupled to the rotor via a shaft, wherein motion of the control knob is translated into motion of the rotor, and wherein the motion of the rotor is translated into the motion of the control knob.

3. The apparatus of claim 2, further comprising a top plate between the control knob and the rotor for concealing the rotor, wherein a clearance exists between the control knob and the top plate.

4. The apparatus of claim 1, wherein the control knob is configured for rotational movement, and wherein the plurality of positions comprises a plurality of rotational positions of the control knob.

5. The apparatus of claim 4, wherein the input signal is an audio signal, and wherein each of the plurality of rotational positions corresponds to a decibel sound level.

6. The apparatus of claim 1, wherein the control knob is configured for translational movement in an upwards and a downwards direction, wherein each of the upwards and the downwards direction is associated with at least one of the plurality of positions.

7. The apparatus of claim 1, wherein the input signal is at least one of an audio signal, a video signal, or an electrical signal.

8. The apparatus of claim 1, wherein the input signal is an audio signal, and wherein the control circuitry is configured to modify at least one of an amplitude, frequency, phase, timbre, echo, sampling characteristic, speed, equalization, reverb, reverse echo, noise property, carrier wave dynamic, or beating of the audio signal.

9. The apparatus of claim 1, wherein the control circuitry is configured to modify a property of the input signal, and wherein the property is either discrete or continuous.

10. The apparatus of claim 1, wherein:
the input signal comprises a first audio signal and a second audio signal;
the control knob is configured to rotate in a clockwise direction and an anticlockwise direction;
the first audio signal is assigned the clockwise direction and the second audio signal is assigned the anticlockwise direction; and
the control circuitry is configured to make the first audio signal more prominent than the second audio signal upon receiving indication of rotation of the control knob in the clockwise direction and make the second audio signal more prominent than the first audio signal upon receiving indication of rotation of the control knob in the anticlockwise direction.

11. An apparatus comprising:
a control knob configured to rotate in a clockwise direction and an anticlockwise direction, each of the clockwise direction and the anticlockwise direction being assigned at least one rotational position, wherein each of the at least one rotational position is associated with a control function; and
a control circuitry configured to:
receive an input signal;
assign one of the clockwise direction or the anticlockwise direction to the input signal;
detect movement of the control knob to a detected position in the assigned one of the clockwise direction or the anticlockwise direction; and
modify a property of the input signal based on the control function associated with the detected position; and
wherein the control knob is coupled to a rotor and a stator, wherein the stator is moveable to allow the control knob to move between the at least one rotational position.

12. The apparatus of claim 11, further comprising a sensor system configured to detect the movement of the control knob in the clockwise direction and the anticlockwise direction, and further configured to detect the detected position.

13. The apparatus of claim 11, wherein the control circuitry is further configured to generate an output signal with the property of the input signal modified.

14. A method comprising:
receiving, by a rotary fader apparatus, at least one input signal, the rotary fader apparatus comprising a control knob moveable to a plurality of positions, wherein each of the plurality of positions is associated with a control function;
detecting, by the rotary fader apparatus, a detected position from the plurality of positions; and
modifying, by the rotary fader apparatus, the at least one input signal based upon the control function associated with the detected position for generating an output signal,
wherein the control knob is coupled to a rotor and a stator, and wherein the stator is moveable to allow the control knob to move between the plurality of positions.

15. The method of claim 14, wherein modifying the at least one input signal comprises causing a fade effect in the at least one input signal based on the detected position.

16. The method of claim 14, further comprising:
receiving, by the rotary fader apparatus, indication for a first fade effect;
rotating, by the rotary fader apparatus, the control knob to one of the plurality of positions associated with the first fade effect; and
fading, by the rotary fader apparatus, the at least one input signal based on the one of the plurality of positions associated with the first fade effect.

17. The method of claim 16, further comprising:
receiving, by the rotary fader apparatus, indication of a second fade effect;
detecting, by the rotary fader apparatus, another one of the plurality of positions associated with the second fade effect; and
fading, by the rotary fader apparatus, the at least one input signal based on the another one of the plurality of positions associated with the second fade effect.

18. The method of claim 14, wherein each of the plurality of positions is associated with a decibel sound level, and wherein modifying the at least one input signal comprises adjusting a property of the at least one input signal in accordance with the decibel sound level associated with the detected position.

* * * * *